(12) United States Patent
Mitsuhashi et al.

(10) Patent No.: US 11,814,537 B2
(45) Date of Patent: Nov. 14, 2023

(54) SILANE COMPOUND CONTAINING PERFLUORO (POLY) ETHER GROUP

(71) Applicant: DAIKIN INDUSTRIES, LTD., Osaka (JP)

(72) Inventors: Hisashi Mitsuhashi, Osaka (JP); Masatoshi Nose, Osaka (JP); Takashi Nomura, Osaka (JP); Shinya Takano, Osaka (JP); Masato Naitou, Osaka (JP); Kaori Ozawa, Osaka (JP); Yuusuke Watanabe, Osaka (JP); Peter Hupfield, Dusseldorf (DE)

(73) Assignee: DAIKIN INDUSTRIES, LTD., Osaka (JP)

(*) Notice: Subject to any disclaimer, the term of this patent is extended or adjusted under 35 U.S.C. 154(b) by 665 days.

(21) Appl. No.: 16/493,382

(22) PCT Filed: Mar. 15, 2018

(86) PCT No.: PCT/JP2018/010236
§ 371 (c)(1),
(2) Date: Sep. 12, 2019

(87) PCT Pub. No.: WO2018/169002
PCT Pub. Date: Sep. 20, 2018

(65) Prior Publication Data
US 2020/0002567 A1 Jan. 2, 2020

(30) Foreign Application Priority Data

Mar. 17, 2017 (JP) ................................. 2017-053407
May 17, 2017 (JP) ................................. 2017-098376
Oct. 30, 2017 (JP) ................................. 2017-209722

(51) Int. Cl.
| | | |
|---|---|---|
| C09D 171/00 | (2006.01) | |
| C09D 7/20 | (2018.01) | |
| C08G 65/336 | (2006.01) | |
| C09D 5/00 | (2006.01) | |

(52) U.S. Cl.
CPC ......... *C09D 171/00* (2013.01); *C08G 65/336* (2013.01); *C09D 5/00* (2013.01); *C09D 7/20* (2018.01); *Y10T 428/31504* (2015.04); *Y10T 428/31663* (2015.04)

(58) Field of Classification Search
CPC .......... C09D 171/00; C09D 5/00; C09D 7/20; C09D 5/16; C08G 65/336; C08G 65/007; C08G 65/226; C08G 77/46; C07F 7/18; C07F 7/122; C09K 3/18
See application file for complete search history.

(56) References Cited

U.S. PATENT DOCUMENTS

| | | |
|---|---|---|
| 6,183,872 B1 | 2/2001 | Tanaka et al. |
| 2009/0208728 A1 | 8/2009 | Itami et al. |
| 2015/0307719 A1* | 10/2015 | Mitsuhashi ............. C07F 7/188 |
| | | 428/447 |
| 2018/0030280 A1* | 2/2018 | Mitsuhashi .......... C09D 5/1675 |
| 2019/0002635 A1 | 1/2019 | Mitsuhashi et al. |
| 2019/0390009 A1 | 12/2019 | Mitsuhashi et al. |

FOREIGN PATENT DOCUMENTS

| | | |
|---|---|---|
| EP | 0 688 777 A2 | 12/1995 |
| EP | 0 937 748 A2 | 8/1999 |
| EP | 1 614 718 A1 | 1/2006 |
| EP | 1 869 103 | 12/2007 |
| JP | 2008-101113 A | 5/2008 |
| JP | 2008-534696 A | 8/2008 |
| JP | 2014-218639 A | 11/2014 |
| JP | 2015-168785 A | 9/2015 |
| WO | 97/07155 A1 | 2/1997 |
| WO | 2006/107082 A2 | 10/2006 |
| WO | 2016/121211 A1 | 8/2016 |
| WO | 2016/190047 A1 | 12/2016 |
| WO | WO 2016/190047 * | 12/2016 |
| WO | 2017/022437 A1 | 2/2017 |

OTHER PUBLICATIONS

WO 2016/190047 machine translation retrieved Jun. 22, 2023.*
Communication dated Nov. 23, 2020, from the European Patent Office in European Application No. 18767281.1.
International Search Report PCT/JP2018/010236, dated Jun. 5, 2018.
International Preliminary Report on Patentability dated Sep. 17, 2019 in International Application No. PCT/JP2018/010236.

* cited by examiner

*Primary Examiner* — Michael B Nelson
(74) *Attorney, Agent, or Firm* — Sughrue Mion, PLLC

(57) ABSTRACT

A perfluoro(poly)ether group-containing silane compound represented by formula (A1), (A2), (B1) or (B2), wherein the symbols are as defined in the description. Also disclosed is a surface-treating agent including the silane compound, a pellet including the surface-treating agent and an article including a base material and a layer formed from the silane compound or surface-treating agent.

$$(\text{Rf-PFPE})_\alpha\text{-X}^1\text{---}(\text{SiR}^a_k\text{R}^b_l\text{R}^c_m)_\alpha \quad (A1)$$

$$(\text{R}^c_m\text{R}^b_l\text{R}^a_k\text{Si})_\alpha\text{---X}^1\text{-PFPE-X}^1\text{---}(\text{SiR}^a_k\text{R}^b_l\text{R}^c_m)_\alpha \quad (A2)$$

$$(\text{Rf-PFPE})_\gamma\text{-X}^2\text{---}(\text{CR}^d_{k2}\text{R}^e_{l2}\text{R}^f_{m2}\text{R}^g_{n2})_\gamma \quad (B1)$$

$$(\text{R}^g_{n2}\text{R}^f_{m2}\text{R}^e_{l2}\text{R}^d_{k2}\text{C})_\gamma\text{---X}^2\text{-PFPE-X}^2\text{---} \\ (\text{CR}^d_{k2}\text{R}^e_{l2}\text{R}^f_{m2}\text{R}^g_{n2})_\gamma \quad (B2)$$

14 Claims, No Drawings

SILANE COMPOUND CONTAINING PERFLUORO (POLY) ETHER GROUP

CROSS REFERENCE TO RELATED APPLICATIONS

This application is a National Stage of International Application No. PCT/JP2018/010236 filed Mar. 15, 2018, claiming priority based on Japanese Patent Application No. 2017-053407 filed Mar. 17, 2017, Japanese Patent Application No. 2017-098376 filed May 17, 2017 and Japanese Patent Application No. 2017-209722 filed Oct. 30, 2017.

TECHNICAL FIELD

The present invention relates to a perfluoro(poly)ether group-containing silane compound.

BACKGROUND ART

A certain fluorine-containing silane compound is known to be able to provide excellent water-repellency, oil-repellency, antifouling property, and the like, when used for a surface treatment of a base material. A layer obtained from a surface-treating agent including a fluorine-containing silane compound (hereinafter, also referred to as "surface-treating layer") is applied as a so-called functional thin film onto various base materials such as a plastic, a glass fiber, and a building material.

Such a fluorine-containing compound known is a perfluoropolyether group-containing silane compound having a perfluoropolyether group in a molecular backbone, and having a hydrolyzable group bound to a Si atom, at a molecule terminal or a terminal portion (see Patent Documents 1 to 2).

PRIOR ART DOCUMENT

Patent Document
Patent Document 1: JP 2008-534696 A
Patent Document 2: International Publication No. 97/07155

SUMMARY OF INVENTION

Technical Problem

A surface-treating layer is required to have high durability in order to provide a desired function to a base material over a long period. A layer obtained from a surface-treating agent including the perfluoropolyether group-containing silane compound can exert the above functions even in the form of a thin film, and therefore is suitably utilized in an optical member required to have light permeability and/or transparency, such as a pair of eye glasses, or a touch panel.

It, however, has been found that the above layer obtained from a surface-treating agent including a conventional perfluoropolyether group-containing silane compound can be deteriorated in functions thereof due to exposure to ultraviolet (UV). Such deterioration can be highly caused particularly in the case of use of a pair of eye glasses, a touch panel of a mobile device, and the like in outdoors.

An object of the present invention is to provide a novel perfluoro(poly)ether group-containing silane compound that enables a layer having water-repellency, oil-repellency, and antifouling property and also having high UV resistance to be formed.

Means to Solve the Problem

The present inventors have made intensive studies, and as a result, have found that a perfluoropolyether group-containing silane compound having a specific structure can be used to result in an enhancement in UV resistance of a surface-treating layer, thereby leading to completion of the present invention.

A first aspect of the present invention provides a perfluoro(poly)ether group-containing silane compound represented by any of formula (A1), (A2), (B1) or (B2):

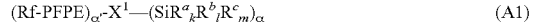  (A1)

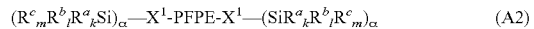  (A2)

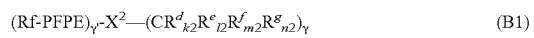  (B1)

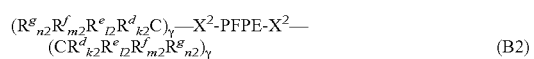  (B2)

wherein:

PFPE represents, each independently at each occurrence, a group represented by formula:

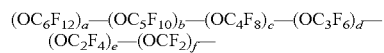

wherein a, b, c, d, e and f are each independently an integer of 0 or more and 200 or less, the sum of a, b, c, d, e and f is at least 1, and the occurrence order of respective repeating units in parentheses with a, b, c, d, e or f is not limited in the formula;

Rf represents, each independently at each occurrence, an alkyl group having 1 to 16 carbon atoms, optionally substituted with one or more fluorine atoms;

$X^1$ represents, each independently at each occurrence, a single bond or a di- to decavalent organic group;

α is, each independently at each occurrence, an integer of 1 to 9;

α' is each independently an integer of 1 to 9;

$R^a$ represents, each independently at each occurrence, —CH$_2$CH$_2$—SiR$^{23}_{r2}$R$^{24}_{s2}$;

$R^{23}$ represents a hydroxyl group or a hydrolyzable group;

$R^{24}$ represents a hydrogen atom or a monovalent organic group;

r2 is, each independently at each occurrence, an integer of 1 to 3;

s2 is, each independently at each occurrence, an integer of 0 to 2;

provided that the sum of r2 and s2 in each —CH$_2$CH$_2$—SiR$^{23}_{r2}$R$^{24}_{s2}$ is 3;

$R^b$ represents, each independently at each occurrence, —Z—SiR$^{11}_{p1}$R$^{12}_{q1}$R$^{13}_{r1}$R$^{14}_{s1}$;

Z represents, each independently at each occurrence, an oxygen atom or a divalent organic group;

$R^{11}$ represents, each independently at each occurrence, $R^{a'}$;

$R^{a'}$ has the same meaning as $R^a$;

$R^{12}$ represents, each independently at each occurrence, $R^{b'}$;

$R^{b'}$ has the same meaning as $R^b$;

the number of Si atoms linearly linked via a Z group in $R^b$ is at most 5;

$R^{13}$ represents, each independently at each occurrence, a hydroxyl group or a hydrolyzable group;

$R^{14}$ represents, each independently at each occurrence, a hydrogen atom or a monovalent organic group;

p1 is, each independently at each occurrence, an integer of 0 to 3;

q1 is, each independently at each occurrence, an integer of 0 to 3;
r1 is, each independently at each occurrence, an integer of 0 to 3;
s1 is, each independently at each occurrence, an integer of 0 to 3;
provided that the sum of p1, q1, r1 and s1 in each —Z—SiR$^{11}_{p1}$R$^{12}_{q1}$R$^{13}_{r1}$R$^{14}_{s1}$ is 3;
R$^c$ represents, each independently at each occurrence, a hydrogen atom, a hydroxyl group, a hydrolyzable group or a monovalent organic group;
k is, each independently at each occurrence, an integer of 0 to 3;
l is, each independently at each occurrence, an integer of 0 to 3;
m is, each independently at each occurrence, an integer of 0 to 3;
provided that the sum of k, l and m in each —SiR$^a_k$R$^b_l$R$^c_m$ is 3,
in the formulae (A1) and (A2), a Si atom to which at least one R$^a$ or R$^{a'}$ is bound and to which R$^b$ or R$^{b'}$ comprising any of at least R$^{13}$ or R$^{23}$ is optionally further bound, in which the sum of R$^a$, R$^{a'}$, R$^b$ and R$^{b'}$ is 2 or more, is present;
X$^2$ represents, each independently at each occurrence, a single bond or a di- to decavalent organic group;
γ is, each independently at each occurrence, an integer of 1 to 9;
γ' is each independently an integer of 1 to 9;
R$^d$ represents, each independently at each occurrence, —CH$_2$CH$_2$—SiR$^{73}_{n4}$R$^{74}_{3-n4}$;
R$^{73}$ represents, each independently at each occurrence, a hydroxyl group or a hydrolyzable group;
R$^{74}$ represents, each independently at each occurrence, a hydrogen atom or a monovalent organic group;
n4 is, each independently at each occurrence, an integer of 1 to 3;
R$^e$ represents, each independently at each occurrence, —Y'—SiR$^{83}_{n3}$R$^{84}_{3-n3}$;
Y' represents, each independently at each occurrence, a divalent organic group;
R$^{83}$ represents, each independently at each occurrence, a hydroxyl group or a hydrolyzable group;
R$^{84}$ represents, each independently at each occurrence, a hydrogen atom or a monovalent organic group;
n3 is an integer of 0 to 3;
R$^f$ represents, each independently at each occurrence, —Z'—CR$^{61}_{p5}$R$^{62}_{q5}$R$^{63}_{r5}$R$^{64}_{s5}$;
Z' has the same meaning as Z;
R$^{61}$ represents, each independently at each occurrence, R$^{d'}$;
R$^{d'}$ has the same meaning as R$^d$;
R$^{62}$ represents, each independently at each occurrence, —Y—SiR$^{83}_{n3}$R$^{84}_{3-n3}$;
Y represents, each independently at each occurrence, a divalent organic group;
R$^{63}$ represents, each independently at each occurrence, R$^{f'}$;
R$^{f'}$ has the same meaning as R$^f$;
R$^{64}$ represents, each independently at each occurrence, a hydroxyl group, a hydrogen atom or a monovalent organic group;
the number of C atoms linearly linked via a Z' group in R$^f$ is at most 5;
p5 is an integer of 0 to 3;
q5 is an integer of 0 to 3;
r5 is an integer of 0 to 3;
s5 is an integer of 0 to 3;
provided that the sum of p5, q5, r5, and s5 in each —Z'—CR$^{61}_{p5}$R$^{62}_{q5}$R$^{63}_{r5}$R$^{64}_{s5}$ is 3;
R$^g$ represents, each independently at each occurrence, a hydrogen atom, a hydroxyl group, or a monovalent organic group;
k2 is, each independently at each occurrence, an integer of 0 to 3;
l2 is, each independently at each occurrence, an integer of 0 to 3;
m2 is, each independently at each occurrence, an integer of 0 to 3;
n2 is, each independently at each occurrence, an integer of 0 to 3;
provided that the sum of k2, l2, m2 and n2 in each ry —CR$^d_{k2}$R$^e_{l2}$R$^f_{m2}$R$^g_{n2}$ is 3; and
in the formulae (B1) and (B2), at least one R$^d$ or R$^{d'}$ is present and at least two groups represented by —SiR$^{73}$ or —SiR$^{83}$ are present.

A second aspect of the present invention provides a surface-treating agent containing the above perfluoro(poly)ether group-containing silane compound.

A third aspect of the present invention provides a pellet containing the above surface-treating agent.

A fourth aspect of the present invention provides an article including a base material, and a layer formed from the above perfluoro(poly)ether group-containing silane compound or the above surface-treating agent, on the surface of the base material.

Effects of Invention

According to the present invention, there is provided a novel perfluoro(poly)ether group-containing silane compound. There is further provided a surface-treating agent obtained by use of the perfluoro(poly)ether group-containing silane compound of the present invention. Such a compound or surface-treating agent can be used to thereby form a surface-treating layer having water-repellency, oil-repellency, and antifouling property, and also having excellent light resistance.

DESCRIPTION OF EMBODIMENTS

As used herein, a "hydrocarbon group" means a group that contains carbon and hydrogen, where one hydrogen atom is removed from hydrocarbon. Such a hydrocarbon group is not limited, and examples thereof include a hydrocarbon group having 1 to 20 carbon atoms, optionally substituted with one or more substituents, for example, an aliphatic hydrocarbon group and an aromatic hydrocarbon group. For example, the "aliphatic hydrocarbon group" may be linear, branched or cyclic, and may be saturated or unsaturated. For example, the hydrocarbon group may have one or more ring structures. For example, such a hydrocarbon group may have one or more N, O, S, Si, amide, sulfonyl, siloxane, carbonyl, carbonyloxy or the like at a terminal or in a molecular chain.

As used herein, each substituent of a "hydrocarbon group" is not limited, and examples thereof include a halogen atom; and one or more groups selected from $C_{1-6}$ alkyl groups, $C_{2-6}$ alkenyl groups, $C_{2-6}$ alkynyl groups, $C_{3-10}$ cycloalkyl groups, $C_{3-10}$ unsaturated cycloalkyl groups, 5- to 10-membered heterocyclyl groups, 5- to 10-membered unsaturated heterocyclyl groups, $C_{6-10}$ aryl groups and 5- to 10-membered heteroaryl groups, which are optionally substituted with one or more halogen atoms.

The alkyl group and the phenyl group are herein optionally unsubstituted or substituted, unless particularly noted. Substituents of such groups are not limited, and examples thereof include one or more groups selected from a halogen atom, a $C_{1-6}$ alkyl group, a $C_{2-6}$ alkenyl group and a $C_{2-6}$ alkynyl group.

As used herein, a "hydrolyzable group" means a group that may undergo a hydrolysis reaction, namely, means a group that may be removed from the main backbone of the compound by a hydrolysis reaction. Examples of the hydrolyzable group include —OR, —OCOR, —O—N=CR$_2$, —NR$_2$, —NHR and halogen (wherein R represents a substituted or unsubstituted alkyl group having 1 to 4 carbon atoms), and the hydrolyzable group is preferably —OR (namely, alkoxy group). Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group described together with the hydrolyzable group is not limited herein, and may be generated by hydrolysis of the hydrolyzable group.

As used herein, a "mono- to decavalent organic group" means a carbon-containing mono- to decavalent group. Such a monovalent organic group is not limited, and examples thereof include a hydrocarbon group. Such a di- to decavalent organic group is not limited, and examples thereof include a di- to decavalent group where further one to nine hydrogen atoms are removed from a hydrocarbon group.

[Perfluoro(Poly)Ether Group-Containing Silane Compound]

Hereinafter, the perfluoro(poly)ether group-containing silane compound of the present invention will be described.

The perfluoro(poly)ether group-containing silane compound of the present invention is a compound represented by any of formula (A1), (A2), (B1) or (B2).

$$(\text{Rf-PFPE})_\alpha\text{—X}^1\text{—}(\text{SiR}^a_k R^b_l R^c_m)_\alpha \quad (A1)$$

$$(R^c_m R^b_l R^a_k \text{Si})_\alpha\text{—X}^1\text{-PFPE-X}^1\text{—}(\text{SiR}^a_k R^b_l R^c_m)_\alpha \quad (A2)$$

$$(\text{Rf-PFPE})_\gamma\text{-X}^2\text{—}(CR^d_{k2} R^e_{l2} R^f_{m2} R^g_{n2})_\gamma \quad (B1)$$

$$(R^g_{n2} R^f_{m2} R^e_{l2} R^d_{k2} C)_\gamma\text{—X}^2\text{-PFPE-X}^2\text{—}(CR^d_{k2} R^e_{l2} R^f_{m2} R^g_{n2})_\gamma \quad (B2)$$

In one embodiment, the perfluoro(poly)ether group-containing silane compound of the present invention is a compound represented by any of formula (A1) or formula (A2).

In one embodiment, the perfluoro(poly)ether group-containing silane compound of the present invention is a compound represented by any of formula (B1) or formula (B2).

The compound represented by any of formula (A1) or formula (A2) will be described.

$$(\text{Rf-PFPE})_\alpha\text{—X}^1\text{—}(\text{SiR}^a_k R^b_l R^c_m)_\alpha \quad (A1)$$

$$(R^c_m R^b_l R^a_k \text{Si})_\alpha\text{—X}^1\text{-PFPE-X}^1\text{—}(\text{SiR}^a_k R^b_l R^c_m)_\alpha \quad (A2)$$

In the formulae (A1) and (A2), PFPE is, independently at each occurrence, a group represented by formula: —(OC$_6$F$_{12}$)$_a$—(OC$_5$F$_{10}$)$_b$—(OC$_4$F$_8$)$_c$—(OC$_3$F$_6$)$_d$—(OC$_2$F$_4$)$_e$—(OCF$_2$)$_f$—.

In the formula, a, b, c, d, e and f are each independently an integer of 0 or more and 200 or less, and the sum of a, b, c, d, e and f is at least 1. Preferably, a, b, c, d, e and f are each independently an integer of 0 or more and 100 or less. The sum of a, b, c, d, e and f is preferably 5 or more, more preferably 10 or more. The sum of a, b, c, d, e and f is preferably 200 or less, more preferably 100 or less, for example, 10 or more and 200 or less, more specifically 10 or more and 100 or less. The occurrence order of respective repeating units in parentheses with a symbol a, b, c, d, e or f is not limited in the formula.

For example, these repeating units may be linear or branched, and is preferably linear. For example, —(OC$_6$F$_{12}$)— may be —(OCF$_2$CF$_2$CF$_2$CF$_2$CF$_2$CF$_2$)—, —(OCF(CF$_3$)CF$_2$CF$_2$CF$_2$CF$_2$)—, —(OCF$_2$CF(CF$_3$)CF$_2$CF$_2$CF$_2$)—, —(OCF$_2$CF$_2$CF(CF$_3$) CF$_2$CF$_2$)—, —(OCF$_2$CF$_2$CF$_2$CF(CF$_3$) CF$_2$)—, —(OCF$_2$CF$_2$CF$_2$CF$_2$CF((CF$_3$))—, or the like, and is preferably —(OCF$_2$CF$_2$CF$_2$CF$_2$CF$_2$CF$_2$)—. For example, —(OC$_5$F$_{10}$)— may be —(OCF$_2$CF$_2$CF$_2$CF$_2$CF$_2$)—, —(OCF(CF$_3$)CF$_2$CF$_2$CF$_2$)—, —(OCF$_2$CF(CF$_3$) CF$_2$CF$_2$)—, —(OCF$_2$CF$_2$CF(CF$_3$)CF$_2$)—, or —(OCF$_2$CF$_2$CF$_2$CF(CF$_3$))—, and is preferably —(OCF$_2$CF$_2$CF$_2$CF$_2$CF$_2$)—. For example, —(OC$_4$F$_8$)— may be any of —(OCF$_2$CF$_2$CF$_2$CF$_2$)—, —(OCF(CF$_3$) CF$_2$CF$_2$)—, —(OCF$_2$CF(CF$_3$)CF$_2$)—, —(OCF$_2$CF$_2$CF (CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, and is preferably —(OCF$_2$CF$_2$CF$_2$CF$_2$)—. For example, —(OC$_3$F$_6$)— may be any of —(OCF$_2$CF$_2$CF$_2$)—, —(OCF(CF$_3$)CF$_2$)— and —(OCF$_2$CF(CF$_3$))—, and is preferably —(OCF$_2$CF$_2$CF$_2$)—. For example, —(OC$_2$F$_4$)— may be any of —(OCF$_2$CF$_2$)— and —(OCF(CF$_3$))—, and is preferably —(OCF$_2$CF$_2$)—.

In one embodiment, PFPE is —(OC$_3$F$_6$)$_d$—: wherein d is an integer of 1 or more and 200 or less, preferably 5 or more and 200 or less, more preferably 10 or more and 200 or less. PFPE is preferably —(OCF$_2$CF$_2$CF$_2$)$_d$—: wherein d is an integer of 1 or more and 200 or less, preferably 5 or more and 200 or less, more preferably 10 or more and 200 or less; or —(OCF(CF$_3$)CF$_2$)$_d$—: wherein d is an integer of 1 or more and 200 or less, preferably 5 or more and 200 or less, more preferably 10 or more and 200 or less. PFPE is more preferably —(OCF$_2$CF$_2$CF$_2$)$_d$—: wherein d is an integer of 1 or more and 200 or less, preferably 5 or more and 200 or less, more preferably 10 or more and 200 or less.

In one embodiment, PFPE is preferably —(OC$_3$F$_6$)$_d$—, d is an integer of 10 or more and 100 or less, d is more preferably an integer of 15 or more and 50 or less, and d is further preferably an integer of 25 or more and 35 or less.

In another embodiment, PFPE is —(OC$_4$F$_8$)$_c$—(OC$_3$F$_6$)$_d$—(OC$_2$F$_4$)$_e$—(OCF$_2$)$_f$—: wherein c and d are each independently an integer of 0 or more and 30 or less, e and f are each independently an integer of 1 or more and 200 or less, preferably 5 or more and 200 or less, more preferably 10 or more and 200 or less, the sum of c, d, e and f is an integer of at least 5 or more, preferably 10 or more, and the occurrence order of respective repeating units in parentheses with a suffix c, d, e or f is not limited in the formula. PFPE is preferably —(OCF$_2$CF$_2$CF$_2$CF$_2$)$_c$—(OCF$_2$CF$_2$CF$_2$)$_d$—(OCF$_2$CF$_2$)$_e$—(OCF$_2$)$_f$—. In one embodiment, for example, PFPE may be —(OC$_2$F$_4$)$_e$—(OCF$_2$)$_f$—: wherein e and f are each independently an integer of 1 or more and 200 or less, preferably 5 or more and 200 or less, more preferably 10 or more and 200 or less, and the occurrence order of respective repeating units in parentheses with a suffix e or f is not limited in the formula.

In further another embodiment, PFPE is a group represented by —(R$^6$-R$^7$)$_j$—. In the formula, R$^6$ is OCF$_2$ or OC$_2$F$_4$, preferably OC$_2$F$_4$. In the formula, R$^7$ is a group selected from OC$_2$F$_4$, OC$_3$F$_6$, OC$_4$F$_8$, OC$_6$F$_{10}$ and OC$_6$F$_{12}$, or a combination of two or three groups independently selected from these groups. $R^7$ is preferably a group selected from $OC_2F_4$, $OC_3F_6$ and $OC_4F_8$, a group selected from $OC_3F_6$, $OC_4F_8$, $OC_6F_{10}$ and $OC_6F_{12}$, or a combination of two or three groups independently selected from these groups. The combination of two or three groups independently selected from $OC_2F_4$, $OC_3F_6$ and $OC_4F_8$ is not limited, and examples thereof include —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F$—, —$OC_3F_6OC_2F_4OC_2F_4$—, —$OC_3F_6OC_2F_4OC_3F_6$—, —$OC_2F_4OC_4F_8OC_2F_4$—, and —$OC_4F_8OC_2F_4OC_2F_4$—. j is an integer of 2 or more, preferably 3 or more, more preferably 5 or more, and 100 or less, preferably 50 or less. In the formulae, for example, $OC_2F_4$, $OC_3F_6$, $OC_4F_8$, $OC_6F_{10}$ and $OC_6F_{12}$ may be linear or branched, and are preferably linear. In this embodiment, PFPE is preferably —$(OC_2F_4$—$OC_3F_6)_j$— or —$(OC_2F_4$—$OC_4F_8)_j$—.

The ratio of e to f (hereinafter, referred to as "e/f ratio") in PFPE is 0.1 or more and 10 or less, preferably 0.2 or more and 5 or less, more preferably 0.2 or more and 2 or less, further preferably 0.2 or more and 1.5 or less, further more preferably 0.2 or more and 0.85 or less. When the e/f ratio is 10 or less, lubricity, friction durability and chemical resistance (for example, durability to artificial sweat) of a surface-treating layer obtained from the compound are more enhanced. As the e/f ratio is lower, lubricity and friction durability of the surface-treating layer are more enhanced. On the other hand, when the e/f ratio is 0.1 or more, stability of the compound can be more enhanced. As the e/f ratio is higher, stability of the compound is more enhanced.

The stability means difficulty of decomposition of a PEPE chain included in the PFPE-containing compound. Such a compound high in stability means the compound including a PFPE chain hardly decomposed, for example, by heat, acid or alkali. The chemical resistance means difficulty of decomposition of the PFPE chain, and difficulty of decomposition of a binding portion (siloxane bond) of glass and the PFPE-containing compound. Favorable chemical resistance of a surface-treating layer means difficulty of the occurrence of a hydrolysis reaction in the surface-treating layer, for example, means difficulty of the occurrence of a hydrolysis reaction even in an acid or alkaline condition.

In the formulae (A1) and (A2), Rf represents, each independently at each occurrence, an alkyl group having 1 to 16 carbon atoms, optionally substituted with one or more fluorine atoms.

For example, an "alkyl group having 1 to 16 carbon atoms" in the alkyl group having 1 to 16 carbon atoms, optionally substituted with one or more fluorine atoms, may be linear or branched, and is preferably a linear or branched alkyl group having 1 to 6 carbon atoms, in particular, 1 to 3 carbon atoms, more preferably a linear alkyl group having 1 to 3 carbon atoms.

Rf preferably is an alkyl group having 1 to 16 carbon atoms, substituted with one or more fluorine atoms, more preferably a $CF_2H$—$C_{1-15}$ perfluoroalkylene group or a $C_{1-16}$ perfluoroalkyl group, further preferably a $C_{1-16}$ perfluoroalkyl group. The alkylene group refers to a group having a —$(C_\beta H_{2\beta})$— structure. The perfluoroalkylene group herein means a group where all hydrogen atoms of an alkylene group are substituted with fluorine atoms.

For example, the perfluoroalkyl group having 1 to 16 carbon atoms may be linear or branched, and is preferably a linear or branched perfluoroalkyl group having 1 to 6 carbon atoms, in particular, 1 to 3 carbon atoms, more preferably a linear perfluoroalkyl group having 1 to 3 carbon atoms, specifically —$CF_3$, —$CF_2CF_3$, or —$CF_2CF_2CF_3$.

The average molecular weight of the Rf-PFPE-moiety is not limited, and is 500 to 30,000, preferably 1,500 to 30,000, more preferably 2,000 to 10,000.

In one embodiment, the number average molecular weight of the Rf-PFPE-moiety or the -PFPE-moiety is preferably 3,000 to 6,000, more preferably 4,000 to 5,500, further preferably 4,500 to 5,500.

In another embodiment, the number average molecular weight of the Rf-PFPE moiety is 500 to 30,000, preferably 1,000 to 20,000, more preferably 2,000 to 15,000.

In another embodiment, the number average molecular weight of the Rf-PFPE-moiety or the -PFPE-moiety may be 4,000 to 30,000, preferably 5,000 to 10,000.

In the formulae (A1) and (A2), $X^1$ represents, each independently at each occurrence, a single bond or a di- to decavalent organic group. $X^1$ is understood to be a linker for connecting a perfluoropolyether moiety (namely, Rf-PFPE moiety or -PFPE-moiety) that provides mainly water-repellency, surface lubricity, and the like, to a moiety (namely, group in parentheses with a symbol a) that provides a binding ability to a base material, in the compound represented by formulae (A1) and (A2). Accordingly, $X^1$ may be an organic group as long as the compound represented by formulae (A1) and (A2) can be stably exist.

The di- to decavalent organic group in $X^1$ is preferably a di- to heptavalent, more preferably di- to tetravalent, further preferably divalent organic group.

In the formula, α is an integer of 1 to 9, and α' is an integer of 1 to 9. Such α and α' may be varied depending on the valence of $X^1$. In the formula (A1), the sum of α and α' is the same as the valence of $X^1$. For example, when $X^1$ is a decavalent organic group, the sum of α and α' is 10, and, for example, α is 9 and α' is 1, α is 5 and α' is 5, or α is 1 and α' is 9. Alternatively, when $X^1$ is a divalent organic group, a and α' are each 1. In the formula (A2), a is a value obtained by subtracting 1 from the valence of $X^1$.

In one embodiment, $X^1$ is a single bond or a di- to tetravalent organic group, α is 1 to 3, and α' is 1.

In another embodiment, $X^1$ is a single bond or a divalent organic group, α is 1, and α' is 1. In this case, the formulae (A1) and (A2) are represented by the following formulae (A1') and (A2'), respectively.

(Rf-PFPE)-$X^1$—$SiR^a_k R^b_l R^c_m$ (A1')

$R^c_m R^b_l R^a_k Si$—$X^1$-PFPE-$X^1$—$SiR^a_k R^b_l R^c_m$ (A2')

In one embodiment, $X^1$ represents a single bond or a di- to decavalent organic group, preferably a single bond, an alkylene group, or a di- to decavalent organic group having at least one selected from the group consisting of —$C_6H_4$— (namely, -phenylene-, hereinafter, representing a phenylene group), —CO— (carbonyl group), —$NR^4$— and —$SO_2$—. $R^4$ is each independently a hydrogen atom, a phenyl group, or a $C_{1-6}$ alkyl group (preferably a methyl group), preferably a hydrogen atom or a methyl group. It is preferable that —$C_6H_4$—, —CO—, —$NR^4$— or —$SO_2$— be included in a molecular backbone of the PFPE-containing silane compound. The molecular backbone here represents a binding chain including relatively longest PFPE in a molecule of the PFPE-containing silane compound.

In the present embodiment, $X^1$ more preferably represents a single bond, an alkylene group, or a di- to decavalent organic group having at least one selected from the group consisting of —$C_6H_4$—, —$CONR^4$—, —$CONR^4$—

—$C_6H_4$—, —CO—, —CO—$C_6H_4$—, —$SO_2NR^4$—, —$SO_2NR^4$—$C_6H_4$—, —$SO_2$—, and —$SO_2$—$C_6H_4$—. It is preferable that —$C_6H_4$—, —$CONR^4$—, —$CONR^4$—$C_6H_4$—, —CO—, —CO—$C_6H_4$—, —$SO_2NR^4$—, —$SO_2NR^4$—$C_6H_4$—, —$SO_2$—, or —$SO_2$—$C_6H_4$— be included in the molecular backbone of the PFPE-containing silane compound.

In the present embodiment, the numbers of atoms for linking a PFPE group and a $SiR^a_k R^b_l R^c_m$ group in $X^1$ may be preferably 20 or less, more preferably 10 or less, further preferably 6 or less. When a plurality of passages for linking one PFPE group and one $SiR^a_k R^b_l R^c_m$ group are present, the "number of atoms for linking a PFPE group and a $SiR^a_k R^b_l R^c_m$ group" means the number of atoms for connecting a PFPE group and a $SiR^a_k R^b_l R^c_m$ group at the shortest distance.

In another embodiment, $X^1$ is not limited, and examples thereof include a divalent group represented by the following formula:

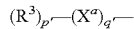

wherein:
  $R^{31}$ represents a single bond, —$(CH_2)_{s'}$— or an o-, m- or p-phenylene group, preferably —$(CH_2)_{s'}$—,
  s' is an integer of 1 to 20, preferably an integer of 1 to 10, more preferably an integer of 1 to 6, particularly preferably an integer of 1 to 3, further more preferably 1 or 2,
  $X^a$ represents —$(X^b)_{l'}$—,
  $X^b$ represents, each independently at each occurrence, a group selected from the group consisting of —O—, —S—, an o-, m- or p-phenylene group, —C(O)O—, —$Si(R^{33})_2$—, —$(Si(R^{33})_2O)_{m'}$—$Si(R^{33})_2$—, —$CONR^{34}$—, —O—$CONR^{34}$—, —$NR^{34}$— and —$(CH_2)_{n'}$—,
  $R^{33}$ represents, each independently at each occurrence, a phenyl group, a $C_{1-6}$ alkyl group or a $C_{1-6}$ alkoxy group, preferably a phenyl group or a $C_{1-6}$ alkyl group, more preferably a methyl group,
  $R^{34}$ represents, each independently at each occurrence, a hydrogen atom, a phenyl group or a $C_{1-6}$ alkyl group (preferably a methyl group),
  m' is, each independently at each occurrence, an integer of 1 to 100, preferably an integer of 1 to 20,
  n' is, each independently at each occurrence, an integer of 1 to 20, preferably an integer of 1 to 6, more preferably an integer of 1 to 3,
  l' is an integer of 1 to 10, preferably an integer of 1 to 5, more preferably an integer of 1 to 3,
  p' is 0 or 1, and
  q' is 0 or 1,
  provided that at least one of p' and q' is 1, and the occurrence order of respective repeating units in parentheses with a symbol p' or q' is not limited. $R^{31}$ and $X^a$ (typically a hydrogen atom in $R^{31}$ and $X^a$) are optionally substituted with one or more substituents selected from a fluorine atom, a $C_{1-3}$ alkyl group and a $C_{1-3}$ fluoroalkyl group.

Preferably, $X^1$ is —$(R^{31})_{p'}$—$(X^a)_{q'}$—$R^{32}$—. $R^{32}$ is a single bond, —$(CH_2)_{t'}$— or an o-, m- or p-phenylene group, preferably —$(CH_2)_{t'}$—. t' is an integer of 1 to 20, preferably an integer of 2 to 6, more preferably an integer of 2 to 3. $R^{32}$ (typically a hydrogen atom in $R^{32}$) is optionally substituted with one or more substituents selected from a fluorine atom, a $C_{1-3}$ alkyl group and a $C_{1-3}$ fluoroalkyl group.

Preferably, $X^1$ may be
a single bond,
a $C_{1-20}$ alkylene group,
—$R^{31}$—$X^c$—$R^{32}$—, or
—$X^d$—$R^{32}$—
wherein $R^{31}$ and $R^{32}$ have the same meaning as described above.
More preferably, $X^1$ is
a single bond,
a $C_{1-20}$ alkylene group, particularly preferably a $C_{1-10}$ alkylene group,
—$(CH_2)_{s'}$—$X^c$—,
—$(CH_2)_{s'}$—$X^c$—$(CH_2)_{t'}$—
—$X^d$—, or
—$X_d$—$(CH_2)_{t'}$—
wherein s' and t' have the same meaning as described above.
In the formula, $X^c$ represents
—O—,
—S—,
—C(O)O—,
—$CONR^{34}$—,
—O—$CONR^{34}$—,
—$Si(R^{33})_2$—,
—$(Si(R^{33})_2O)_{m'}$—$Si(R^{33})_2$—,
—O—$(CH_2)_{u'}$— $(Si(R^{33})_2O)_{m'}$—$Si(R^{33})_2$—,
—O—$(CH_2)_{u'}$—$Si(R^{33})_2$—O—$Si(R^{33})_2$—$CH_2CH_2$—Si$(R^{33})_2$—O—$Si(R^{33})_2$—,
—O—$(CH_2)_{u'}$—$Si(OCH_3)_2OSi(OCH_3)_2$—,
—$CONR^{34}$—$(CH_2)_{u'}$— $(Si(R^{33})_2O)_{m'}$—$Si(R^{33})_2$—,
—$CONR^{34}$—$(CH_2)_{u'}$—$N(R^{34})$—, or
—$CONR^{34}$— (o-, m- or p-phenylene)-$Si(R^{33})_2$—
wherein $R^{33}$, $R^{34}$ and m' have the same meaning as described above, and
u' is an integer of 1 to 20, preferably an integer of 2 to 6, more preferably an integer of 2 to 3. $X^c$ is preferably —O—.
In the formula, $X^d$ represents
—S—,
—C(O)O—,
—$CONR^{34}$—,
—$CONR^{34}$—$(CH_2)_{u'}$—$(Si(R^{33})_2O)_{m'}$—$Si(R^{33})_2$—,
—$CONR^{34}$—$(CH_2)_{u'}$—$N(R^{34})$—, or
—$CONR^{34}$— (o-, m- or p-phenylene)-$Si(R^{33})_2$—
wherein respective signs have the same meaning as described above.
More preferably, $X^1$ can be
a single bond,
a $C_{1-20}$ alkylene group,
—$(CH_2)_{s'}$—$X^c$—$(CH_2)_{t'}$—, or
—$X^d$—$(CH_2)_{t'}$—
wherein respective signs have the same meaning as described above.
Further more preferably, $X^1$ is
a single bond,
a $C_{1-20}$ alkylene group, particularly preferably a $C_{1-10}$ alkylene group,
—$(CH_2)_{s'}$—O—$(CH_2)_{t'}$—,
—$(CH_2)_{s'}$— $(Si(R^{33})_2O)_{m'}$—$Si(R^{33})_2$— $CH_2)_{t'}$—,
—$(CH_2)_{s'}$—$(CH_2)_{u'}$— $(Si(R^{33})_2O)_{m'}$—$Si(R^{33})_2$—$(CH_2)_{t'}$—, or
—$(CH_2)_{s'}$—O—$(CH_2)_{t'}$—$Si(R^{33})_2$—$(CH_2)_{u'}$—$Si(R^{33})_2$—$(C_vH_{2v})$—
wherein $R^{33}$, m', s', t' and u' have the same meaning as described above, and v is an integer of 1 to 20, preferably an integer of 2 to 6, more preferably an integer of 2 to 3.
In the formula, —$(C_vH_{2v})$— may be linear or branched, and may be, for example, —$CH_2$—, —$CH_2CH_2$—, —$CH_2CH_2CH_2$—, —$CH(CH_3)$—, or —$CH(CH_3)CH_2$—.

In one embodiment, $X^1$ may be a group represented by $-(O)_{t1}-(R^{f1}O)_{t2}-R^{f2}-(C(=O)N(R^{f3}))_{t3}-R^{f4}-$.

t1 is 0 or 1.

$R^{f1}$ is a fluoroalkylene group not having any branched structure including one or more hydrogen atoms. $R^{f1}$ is preferably a $C_{2-6}$ fluoroalkylene group. The number of hydrogen atoms included in $R^{f1}$ is preferably in the range of 1 to 4, more preferably 1 or 2.

When two or more kinds of $R^{f1}O$ are present in $(R^{f1}O)_{t2}$, the occurrence order of respective $(R^{f1}O)$ is not limited in the formula.

t2 is an integer of 0 to 4, more preferably an integer of 0 to 2.

$R^{f2}$ is a single bond, a perfluoroalkylene group not having any branched structure, or a fluoroalkylene group not having any branched structure including one or more hydrogen atoms. The perfluoroalkylene group or the fluoroalkylene group preferably includes 1 to 10 carbon atoms.

$R^{f3}$ is a hydrogen atom, or an alkyl group (preferably a $C_{1-4}$ alkyl group).

t3 is 0 or 1.

When t3 is 0, $R^{f2}$ is preferably a single bond. In this case (namely, in the case that $(R^{f1}O)_{t2}$ and $R^{f4}$ are directly bonding), $(R^{f1}O)$ which connects to $R^{f4}$ in $(R^{f1}O)_{t2}$ is preferably a group represented by $(R^{f5}CH_2O)$. $R^{f5}$ is a group which has a smaller number of carbon atoms than $R^{f1}$ by one carbon atom and which is a perfluoroalkylene group, or a fluoroalkylene group having one or more hydrogen atoms. $R^{f5}$ is preferably a perfluoroalkylene group. $(R^{f5}CH_2O)$ is preferably $(CF_2CH_2O)$, $(CF_2CF_2CH_2O)$, $(CF_2CF_2CF_2CH_2O)$, $(CF_2CF_2CF_2CF_2CH_2O)$, or the like. In this case, t2 is preferably 1.

When t3 is 1, t2 is 0 to 2 and $R^{f2}$ is preferably a perfluoroalkylene group, or a fluoroalkylene group having one or more hydrogen atoms, more preferably a perfluoroalkylene group, particularly preferably a $C_{1-6}$ perfluoroalkylene group.

$R^{f4}$ is a single bond, an alkylene group having 1 to 10 carbon atoms, a group having an ethereal oxygen atom at a terminal of an alkylene group having 1 to 10 carbon atoms (provided that such a terminal is a terminal bound to $(SiR^a_k R^b_l R^c_m)$), a group having an ethereal oxygen atom between carbon-carbon atoms of an alkylene group having 2 to 10 carbon atoms, or a group having an ethereal oxygen atom at a terminal and between carbon-carbon atoms of an alkylene group having 2 to 10 carbon atoms (provided that such a terminal is a terminal bound to $(SiR^a_k R^b_l R^c_m)$) Examples of such a group having an ethereal oxygen atom include $-CH_2CH_2-O-$ and $-CH_2CH_2-O-CH_2-$.

$R^{f4}$ is preferably a single bond or a $C_{1-4}$ alkylene group, more preferably a single bond or a $C_{1-2}$ alkylene group.

Examples of $X^1$ may include
$-(O)_{t1}-(R^{f1}O)_{t2}-$,
$-(O)_{t1}-(R^{f1}O)_{t2}-CH_2O-$,
$-(O)_{t1}-(R^{f1}O)_{t2}-CH_2OCH_2-$,
$-(O)_{t1}-(R^{f1}O)_{t2}-CH_2O-(CH_2)_2-O-$,
$(O)_{t1}-(R^{f1}O)_{t2}-CH_2O-(CH_2)_2-O-CH_2-$,
$-(O)_{t1}-(R^{f1}O)_{t2}-R^{f2}-C(O)NH-$,
$-(O)_{t1}-(R^{f1}O)_{t2}-R^{f2}-C(O)NHCH_2-$,
$-(O)_{t1}-(R^{f1}O)_{t2}-R^{f2}-C(O)NH(CH_2)_2-$,
$-(O)_{t1}-(R^{f6}CH_2O)-CH_2-$,
$-(O)_{t1}-(R^{f6}CH_2O)-CH_2-O-CH_2-$,
$-C(O)NH-R^{f4}-$, or
$-(O)_{t1}-R^{f6}CH_2OCF_2CHFOCF_2CF_2CF_2-C(O)NH-R^{f4}-$ (for example, $-(O)_{t1}-CF_2CH_2OCF_2CHFOCF_2CF_2CF_2-C(O)NH-R^{f4}-$).

$R^{f1}$, $R^{f2}$, $R^{f4}$, t1 and t2 have the same meaning as described above. t1 is preferably 1. $R^{f6}$ is a perfluoroalkylene group not having any branched structure.

The $X^1$ group is optionally substituted with one or more substituents selected from a fluorine atom, a $C_{1-3}$ alkyl group and a $C_{1-3}$ fluoroalkyl group (preferably a $C_{1-3}$ perfluoroalkyl group).

In another embodiment, examples of the $X^1$ group include the following groups:

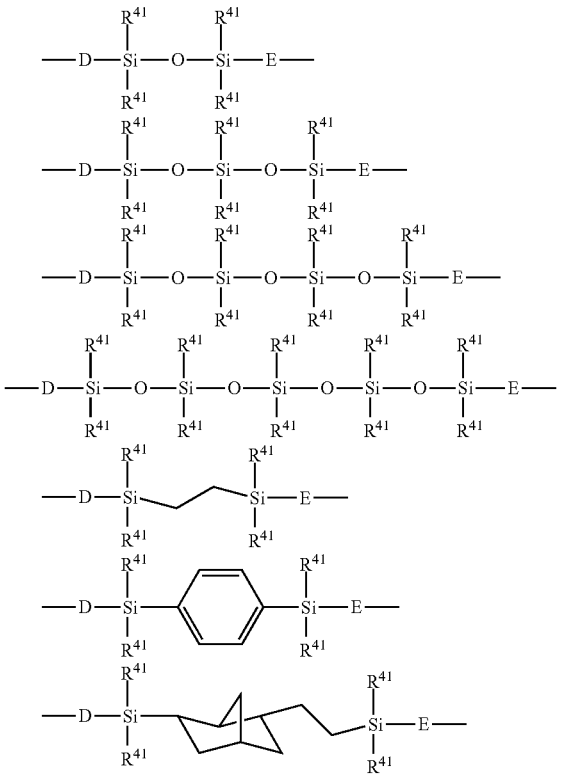

wherein $R^{41}$ is, each independently a hydrogen atom, a phenyl group, an alkyl group having 1 to 6 carbon atoms, or a $C_{1-6}$ alkoxy group, preferably a methyl group;

D is a group selected from
$-CH_2O(CH_2)_2-$,
$-CH_2O(CH_2)_3-$,
$-CF_2O(CH_2)_3-$,
$-(CH_2)_2-$,
$-(CH_2)_3-$,
$-(CH_2)_4-$,
$-CONH-(CH_2)_3-$,
$-CON(CH_3)-(CH_2)_3-$,
$-CON(Ph)-(CH_2)_3-$ (wherein Ph means phenyl), and

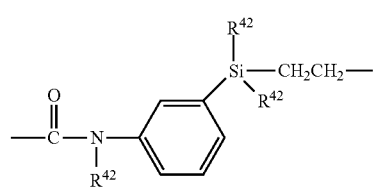

(wherein $R^{42}$ each independently represents a hydrogen atom, a $C_{1-6}$ alkyl group or a $C_{1-6}$ alkoxy group, preferably a methyl group or a methoxy group, more preferably a methyl group.), E is —(CH$_2$)$_{ne}$— (ne is an integer of 2 to 6), and
D binds to PFPE of a molecular backbone and E binds to a group opposite to PFPE.

Specific examples of X$^1$ include:
a single bond,
—CH$_2$OCH$_2$—,
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_1$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$) CF$_2$OCF$_2$—,
—CH$_2$OCH$_2$CF$_2$CF$_2$OCF(CF$_3$) CF$_2$OCF$_2$CF$_2$—,
—CH$_2$OCH$_2$CF$_2$CF$_2$OCF(CF$_3$) CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$) CF$_2$OCF$_2$—,
—CH$_2$OCH$_2$CHFCF$_2$OCF(CF$_3$) CF$_2$OCF$_2$CF$_2$—,
—CH$_2$OCH$_2$CHFCF$_2$OCF(CF$_3$) CF$_2$OCF$_2$CF$_2$CF$_2$—,
—CH$_2$OCF$_2$CHFOCF$_2$CF$_2$—C(O) NH—CH$_2$—,
—CH$_2$OCH$_2$ (CH$_2$)$_7$CH$_2$S i (OCH$_3$)$_2$OSi(OCH$_3$)$_2$(CH$_2$)$_2$Si(OCH$_3$)$_2$OSi(OCH$_3$)$_2$ (C H$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(C$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_5$—,
—(CH$_2$)$_6$—,
—CO—,
—CONH—,
—CONH—CH$_2$—,
—CONH—(CH$_2$)$_2$—,
—CONH—(CH$_2$)$_3$—,
—CON(CH$_3$)—(CH$_2$)$_3$—,
—CON(Ph)-(CH$_2$)$_3$— (wherein Ph means phenyl),
—CONH—(CH$_2$)$_6$—,
—CON(CH$_3$)—(CH$_2$)$_6$—,
—CON(Ph)-(CH$_2$)$_6$— (wherein Ph means phenyl),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_2$OSi(CH$_3$)$_2$(CH$_2$)$_2$,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

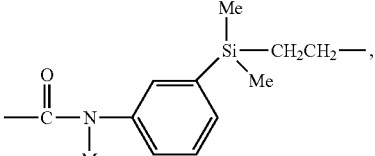

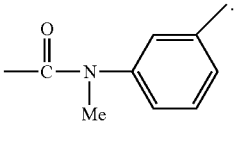

In another preferable embodiment, X$^1$ is a single bond, an alkylene group having 1 to 6 carbon atoms, —R$^{51}$—C$_6$H$_4$—R$^{52}$—, —R$^{51}$—CONR$^4$—R$^{52}$—, —R$^{51}$—CONR$^4$—C$_6$H$_4$—R$^{52}$—, —R$^{51}$—CO—R$^{52}$—, —R$^{51}$—CO—C$_6$H$_4$—R$^{52}$—, —R$^{51}$—SO$_2$NR$^4$—R$^{52}$—, —R$^{51}$—SO$_2$NR$^4$—C$_6$H$_4$—R$^{52}$—, —R$^{51}$—SO$_2$—R$^{52}$—, or —R$^{51}$—SO$_2$—C$_6$H$_4$—R$^{52}$—. R$^{51}$ and R$^{52}$ each independently represent a single bond, or an alkylene group having 1 to 6 carbon atoms, preferably a single bond, or an alkylene group having 1 to 3 carbon atoms. R$^4$ has the same meaning as described above. The alkylene group is substituted or unsubstituted, preferably unsubstituted. Examples of the substituent of the alkylene group may include a halogen atom, preferably a fluorine atom. The alkylene group is linear or branched, preferably linear.

In the present embodiment, X$^1$ can be further preferably
a single bond,
an alkylene group having 1 to 6 carbon atoms, preferably 1 to 3 carbon atoms
—C$_6$H$_4$—R$^{52'}$—,
—CONR$^{4'}$—R$^{52'}$—,
—CONR$^{4'}$—C$_6$H$_4$—R$^{52'}$—,
—CO—R$^{52'}$—,
—CO—C$_6$H$_4$—R$^{52'}$—,
—SO$_2$NR$^{4'}$—R$^{52'}$—,
—SO$_2$NR$^{4'}$—C$_6$H$_4$—R$^{52'}$—,
—SO$_2$—R$^{52'}$—,
—SO$_2$-C$_6$H$_4$-R$^{52'}$—,
—R$^{51'}$—C$_6$H$_4$—,
—R$^{51'}$—CONR$^{4'}$—,
—R$^{51'}$—CONR$^{4'}$—C$_6$H$_4$—, —R$^{51'}$—CO—,
—R$^{51'}$—CO—C$_6$H$_4$—,
—R$^{51'}$—SO$_2$NR$^{4'}$—,
—R$^{51'}$—SO$_2$NR$^{4'}$—C$_6$H$_4$—,
—R$^{51'}$—SO$_2$—,
—R$^{51'}$—SO$_2$—C$_6$H$_4$—,
—C$_6$H$_4$—,
—CONR$^{4'}$—,
—CONR$^{4'}$—C$_6$H$_4$—,
—CO—,
—CO—C$_6$H$_4$—,
—SO$_2$NR$^{4'}$—,
—SO$_2$NR$^{4'}$—C$_6$H$_4$—,
—SO$_2$—, or
—SO$_2$—C$_6$H$_4$—
(wherein R$^{51'}$ and R$^{52'}$ are each independently linear alkylene group having a 1 to 6 carbon atoms, preferably 1 to 3 carbon atoms, and R$^{4'}$ is a hydrogen atom or methyl.).

In the present embodiment, specific examples of X$^1$ include a single bond,
an alkylene group having 1 to 6 carbon atoms,
—CONH—,
—CONH—CH$_2$—,
—CONH—(CH$_2$)$_2$—,
—CONH—(CH$_2$)$_3$—,
—CON(CH$_3$)—,
—CON(CH$_3$)—CH$_2$—,
—CON(CH$_3$)—(CH$_2$)$_2$—,
—CON(CH$_3$)—(CH$_2$)$_3$—,
—CH$_2$—CONH—,
—CH$_2$—CONH—CH$_2$—,
—CH$_2$—CONH—(CH$_2$)$_2$—,
—CH$_2$—CONH—(CH$_2$)$_3$—,
—CONH—C$_6$H$_4$—,
—CON(CH$_3$)—C$_6$H$_4$—,
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CON(CH$_3$)—C$_6$H$_4$—,
—CO—,
—CO—C$_6$H$_4$—,
—C$_6$H$_4$—,
—SO$_2$NH—,
—SO$_2$NH—CH$_2$—,
—SO$_2$NH—(CH$_2$)$_2$—,
—SO$_2$NH—(CH$_2$)$_3$—,
—SO$_2$NH—C$_6$H$_4$—,
—SO$_2$N(CH$_3$)—,
—SO$_2$N(CH$_3$)—CH$_2$—,
—SO$_2$N(CH$_3$)—(CH$_2$)$_2$—,
—SO$_2$N(CH$_3$)—(CH$_2$)$_3$—,
—SO$_2$N(CH$_3$)—C$_6$H$_4$—,
—SO$_2$—,
—SO$_2$—CH$_2$—,
—SO$_2$—(CH$_2$)$_2$—,
—SO$_2$—(CH$_2$)$_3$,
—SO$_2$—C$_6$H$_4$—.

In one embodiment, X$^1$ is a single bond. In the present embodiment, PFPE and a group (namely, group in parentheses with a symbol a in (A1) and (A2)) having binding ability to a base material layer form a direct bond.

In further another embodiment, examples of the X$^1$ group include the following groups:

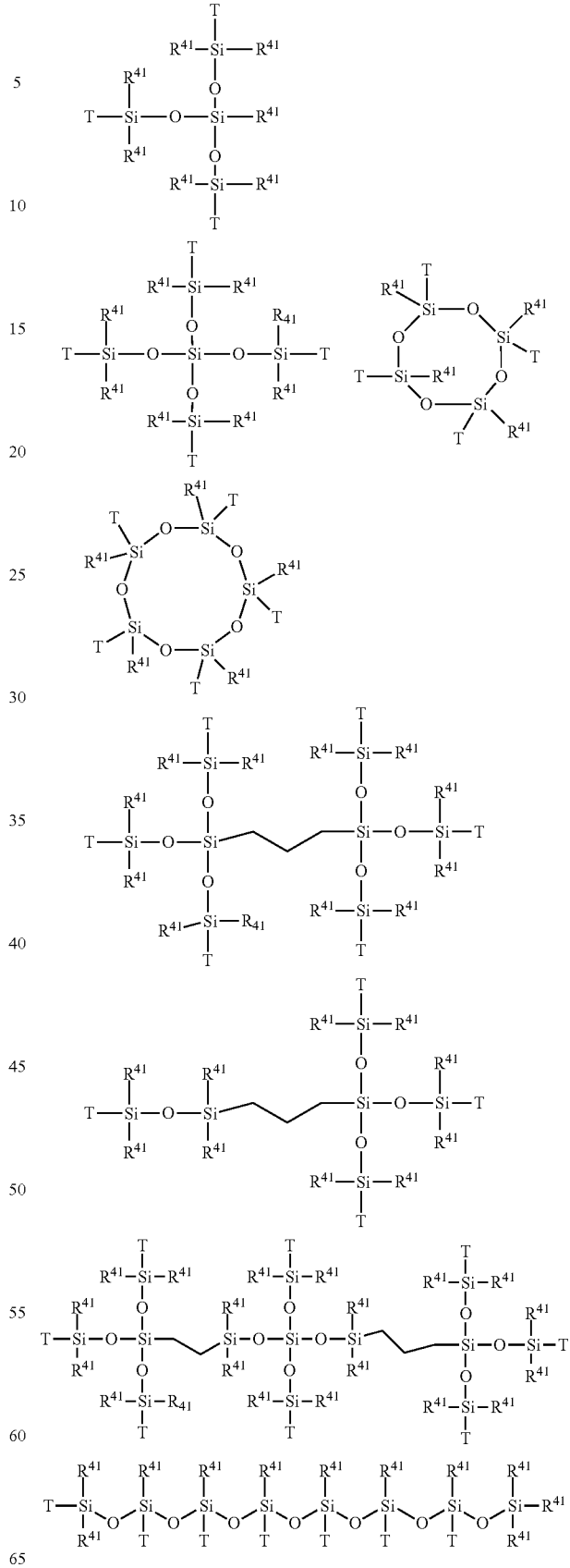

wherein $R^{41}$ is each independently a hydrogen atom, a phenyl group, an alkyl group having 1 to 6 carbon atoms, or a $C_{1-6}$ alkoxy group, preferably a methyl group;

T in such each $X^1$ group is the following group bound to PFPE as a molecular backbone:

—$CH_2O(CH_2)_2$—,

—$CH_2O(CH_2)_3$—,

—$CF_2O(CH_2)_3$—,

—$CH_2$—,

—$(CH_2)_2$—,

—$(CH_2)_3$—,

—$(CH_2)_4$—,

—CONH—$(CH_2)_3$—,

—CON($CH_3$)—$(CH_2)_3$—,

—CON(Ph)-$(CH_2)_3$— (wherein Ph means phenyl), or

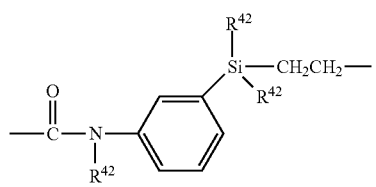

(wherein $R^{42}$ each independently represents a hydrogen atom, a $C_{1-6}$ alkyl group or a $C_{1-6}$ alkoxy group, preferably a methyl group or a methoxy group, more preferably a methyl group), other of T is —$(CH_2)_{n''}$— ("n" is an integer of 2 to 6) bound to a group opposite to PFPE as a molecular backbone, and residual T, if present, can be each independently a methyl group, a phenyl group, a $C_{1-6}$ alkoxy group, or a radical capturing group or an UV absorbing group.

The radical capturing group is not limited as long as such a group can capture a radical generated by light irradiation, and examples thereof include any residue of a benzophenone compound, a benzotriazole compound, a benzoate compound, a phenyl salicylate compound, a crotonic acid compound, a malonate compound, an organoacrylate compound, a hindered amine compound, a hindered phenol compound, or a triazine compound.

The UV absorbing group is not limited as long as such a group can absorb UV light, and examples thereof include any residue of a benzotriazole compound, a hydroxybenzophenone compound, an ester compound of a substituted or unsubstituted benzoic acid or salicylic acid compound, an acrylate or alkoxy cinnamate compound, an oxamide compound, an oxanilide compound, a benzoxazinone compound, or a benzoxazole compound.

In a preferable embodiment, preferable examples of the radical capturing group or the UV absorbing group include

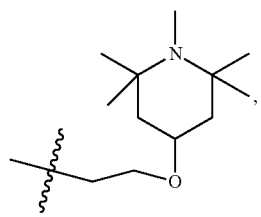

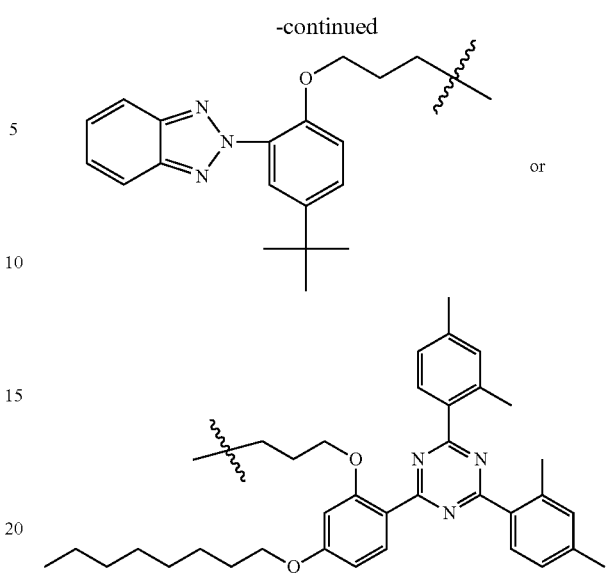

In this embodiment, $X^1$ is a tri- to decavalent organic group.

In one embodiment, $X^1$ is represented by —$X^{11}(OH)_{n1}(X^{12})_{3-n1}$ or —$X^{11}(OX^{12})_{n1}(X^{12})_{3-n1}$. $X^{11}$ is a carbon atom. $X^{12}$ represents, each independently at each occurrence, a single bond, or a di- to hexavalent hydrocarbon group, and may have a silicon atom and/or a siloxane bond. $X^{12}$ links $X^{11}$ to —$SiR^a_k R^b_l R^c_m$. n1 is, each independently at each occurrence, an integer of 1 to 3, preferably 1.

In the present embodiment, the formula (A1) and the formula (A2) are represented by, for example, the following formula (A1″), formula (A2″), formula (A1‴) and formula (A2‴).

(A1″)

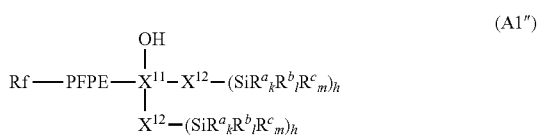

(A2″)

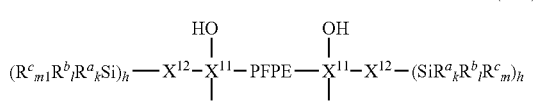

(A1‴)

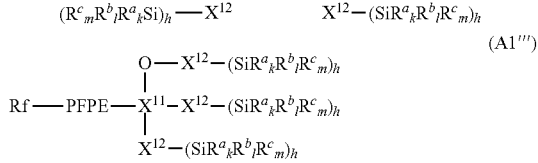

(A2‴)

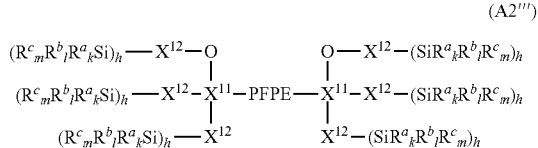

In the formulae, Rf, PFPE, $X^{11}$ and $X^{12}$ have the same meaning as described above. h is an integer of 1 to 5. $R^a$, $R^b$, $R^c$, k, l and m are as described below.

In a preferable one embodiment, X' is, each independently at each occurrence, —$CH_2CH_2$— or —$CH_2CH_2CH_2$—. In the present embodiment, the PFPE-containing silane compound represented by the formula (A1) or (A2) can contribute to formation of a surface-treating layer having more favorable UV durability and/or friction durability.

In the embodiment, $X^1$ is more preferably —$CH_2CH_2CH_2$—.

In the formulae (A1) and (A2), $R^a$ represents, each independently at each occurrence, —$CH_2CH_2$—$SiR^{23}_{r2}R^{24}_{s2}$.

In the formula, $R^{23}$ represents a hydroxyl group or a hydrolyzable group. The hydrolyzable group has the same meaning as described above.

In the formula, $R^{24}$ represents a hydrogen atom or a monovalent organic group.

The monovalent organic group is preferably a group other than the hydrolyzable group.

The monovalent organic group is more preferably a lower alkyl group or a phenyl group, further preferably a lower alkyl group. The lower alkyl group is preferably an alkyl group having 1 to 20 carbon atoms, more preferably an alkyl group having 1 to 6 carbon atoms, further preferably a methyl group.

In the formula, r2 is, each independently at each occurrence, an integer of 1 to 3; and s2 is, each independently at each occurrence, an integer of 0 to 2, provided that the sum of r2 and s2 in each —$CH_2CH_2$—$SiR^{23}_{r2}R^{24}_{s2}$ is 3.

r2 is preferably 2 or more, more preferably 3.

In the formulae (A1) and (A2), $R^b$ represents, each independently at each occurrence, —$Z$—$SiR^{11}_{p1}R^{12}_{q1}R^{13}_{r1}R^{14}_{s1}$.

In the formulae, Z represents, each independently at each occurrence, an oxygen atom or a divalent organic group. The divalent organic group has the same meaning as described above.

Z is preferably a divalent organic group. The divalent organic group preferably does not encompass any group that forms a siloxane bond with a Si atom (Si atom to which $R^b$ is bound) at a terminal of the molecular backbone in the formula (A1) or formula (A2).

Z is preferably an alkylene group, —$(CH_2)_{g1}$—O—$(CH_2)_{h1}$—: wherein g1 is an integer of 0 to 6, preferably an integer of 1 to 6, and h1 is an integer of 0 to 6, preferably an integer of 1 to 6 or -phenylene-$(CH_2)_{i1}$—: wherein i1 is an integer of 0 to 6. For example, such groups may be substituted with, for example, one or more substituents selected from a fluorine atom, a $C_{1-6}$ alkyl group, a $C_{2-6}$ alkenyl group, and a $C_{2-6}$ alkynyl group. Z is more preferably a linear or branched alkylene group, further preferably a linear alkylene group from the viewpoint of particularly favorable UV resistance. The number of carbon atom(s) forming the alkylene group in Z is preferably in the range from 1 to 6, more preferably in the range from 1 to 3. Most preferably, Z is —$CH_2CH_2$—. The alkylene group is as described above.

In the formulae, $R^{11}$ represents, each independently at each occurrence, $R^{a'}$. $R^{a'}$ has the same meaning as $R^a$.

In the formula, $R^{12}$ represents, each independently at each occurrence, $R^{b'}$. $R^{b'}$ has the same meaning as $R^b$.

The number of Si atoms linearly linked via the Z group in $R^b$ is at most 5. That is, when at least one $R^{12}$ is present in $R^b$, the number of Si atoms linearly linked via the Z group in $R^b$ is 2 or more, and the number of Si atoms linearly linked via the Z group is at most 5. Herein, "the number of Si atoms linearly linked via the Z group in $R^b$" is equal to the number of repeating units of —Z—Si— linearly linked in $R^b$.

One example where a Si atom is, for example, linked via the Z group in $R^b$ is shown below.

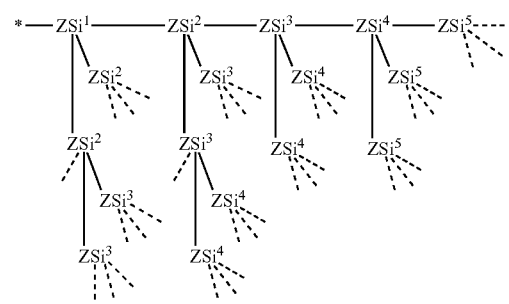

In the formula, "*" means a moiety bound to Si of the backbone, and " . . . " means that a predetermined group other than ZSi is bound, namely, means an end point of the repeating of ZSi is terminated when all three bonds of Si atom correspond to " . . . ". The superscript on right shoulder of Si means the number of occurrences of Si linearly linked via the Z group in counting with "*" as the origin. That is, a chain where ZSi is repeated and terminated at $Si^2$ means that the "number of Si atoms linearly linked via the Z group in $R^b$" is 2, and, similarly, a chain where ZSi is repeated and terminated at $Si^3$, $Si^4$ or $Si^5$ means that the "number of Si atoms linearly linked via the Z group in $R^b$" is 3, 4 or 5, respectively. While a plurality of ZSi chains are present in $R^b$ as is clear from the above formula, all the chains do not necessarily have the same length, and may each have arbitrary length.

In a preferable embodiment, the "number of Si atoms linearly linked via the Z group in $R^b$" is 1 (left formula) or 2 (right formula) in all chains, as described below.

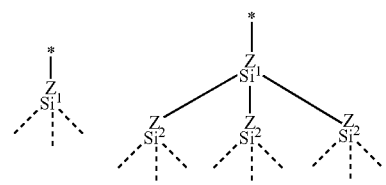

In one embodiment, the number of Si atoms linearly linked via the Z group in $R^b$ is 1 or 2, preferably 1.

In the formulae, $R^{13}$ represents, each independently at each occurrence, a hydroxyl group or a hydrolyzable group. The hydrolyzable group has the same meaning as described above.

In the formula, $R^{14}$ represents, each independently at each occurrence, a hydrogen atom or a monovalent organic group. The monovalent organic group has the same meaning as described above. $R^{14}$ is preferably a hydrogen atom or a lower alkyl group. The lower alkyl group has the same meaning as described above.

In the formula, p1 is, each independently at each occurrence, an integer of 0 to 3; q1 is, each independently at each occurrence, an integer of 0 to 3; r1 is, each independently at each occurrence, an integer of 0 to 3; and s1 is, each independently at each occurrence, an integer of 0 to 3, provided that the sum of p1, q1, r1 and s1 in each —$Z$—$SiR^{11}_{p1}R^{12}_{q1}R^{13}_{r1}R^{14}_{s1}$ is 3.

In another preferable embodiment, q1 is 0 and p1 is preferably 1 or more, more preferably 2 or more, further preferably 3, in $R^b$ or $R^{b'}$. When p1 is 1 or 2, the sum of p1 and r1 is preferably 3.

In a preferable embodiment, r1 in $R^{b1}$ (or $R^b$ when $R^{b1}$ is absent) at a terminal in $R^b$ is preferably 2 or more, for example, 2 or 3, more preferably 3.

In another preferable embodiment, p1 in $R^{b1}$ (or $R^b$ when $R^{b1}$ is absent) at a terminal in $R^b$ is preferably 2 or more, for example, 2 or 3, more preferably 3.

$R^{b1}$ and $R^b$ at a terminal mean $R^{b1}$ and $R^b$ where q1 is 0, respectively.

In the formulae (A1) and (A2), $R^c$ represents, each independently at each occurrence, a hydrogen atom, a hydroxyl group, a hydrolyzable group or a monovalent organic group. The hydrolyzable group and the monovalent organic group have the same meaning as described above.

In the formulae (A1) and (A2), k is, each independently at each occurrence, an integer of 0 to 3; l is, each independently at each occurrence, an integer of 0 to 3; and m is, each independently at each occurrence, an integer of 0 to 3, provided that the sum of k, l and m in each —$SiR^a_kR^b_lR^c_m$ is 3.

In the formulae (A1) and (A2), a Si atom to which at least one $R^a$ or $R^{a'}$ is bound and to which $R^b$ or $R^{b'}$ is optionally further bound is present, wherein $R^b$ or $R^{b'}$ comprises any of at least $R^{13}$ or $R^{23}$, and the sum of $R^a$, $R^{a'}$, $R^b$ and $R^{b'}$ binding to the Si atom is 2 or more.

In one embodiment, at least one k is 2 or 3, preferably 3. In such an embodiment, l may be 0 in —$SiR^a_kR^b_lR^c_m$ where k is 2. That is, —$SiR^a_kR^b_lR^c_m$ may be —$SiR^a_2R^c$.

In one embodiment, k is 2 or 3, preferably 3. In such an embodiment, l may be 0 in —$SiR^a_kR^b_lR^c_m$ where k is 2. That is, —$SiR^a_kR^b_lR^c_m$ may be —$SiR^a_2R^c$.

The perfluoro(poly)ether group-containing silane compound of the present invention can have the above structure, particularly, $R^a$ or $R^{a'}$, thereby contributing to formation of a surface-treating layer which has more UV resistance and which is more favorable in durability to acid or alkali.

In a preferable embodiment, the formulae (A1) and (A2) each have at least one of the following formulae (a1) to (a4) at a terminal.

  (a1)

wherein the sum of k and m is 3, and k is 2 or 3 and k is more preferably 3,

  (a2)

wherein the sum of k, l and m is 3;
k is an integer of 1 to 3, and when k is 1, not only l is 1 or 2 and $R^b$ is represented by (—Z—$SiR^{11}_{p1}R^{13}_{r1}R^{14}_{s1}$) but also the sum of p1, r1 and s1 is 3 and at least one of p1 or r1 is an integer of 1 to 3 in $R^b$,
more preferably k is 2 or 3,
further preferably k is 2 or 3, and when k is 2, l is 1 and r1 is an integer of 1 to 3,
particularly preferably k is 3,

  (a3)

wherein the sum of p1, r1 and s1 is 3; and p1 is 2 or 3, more preferably p1 is 2 and r1 is 1, or p1 is 3,
particularly preferably p1 is 3, or

  (a4)

wherein the sum of p1, q1, r1 and s1 is 3;
p1 is an integer of 1 to 3, and when p1 is 1, not only q1 is 1 or 2 and $R^{12}$ is represented by (—Z—$SiR^{11}_{p1}R^{13}_{r1}R^{14}_{s1}$), but also the sum of p1, r1 and s1 is 3 and at least one of p1 or r1 is an integer of 1 to 3 in $R^{12}$, more preferably p1 is 2 or 3, particularly preferably p1 is 3.

In the formula (a1) to (a4), r2 is particularly preferably 3.

In another preferable embodiment, in at least one, preferably all —$SiR^a_kR^b_lR^c_m$, each independently, k is 1, 2 or 3, preferably 2 or 3, more preferably 3, l is 0, 1 or 2, preferably 0 or 1, more preferably 0, m is 0, and when $R^b$ is present, $R^b$ is —Z—$SiR^{13}_{r1}R^{14}_{s1}$1, r1 is 1, 2 or 3, preferably 2 or 3, more preferably 3, and s1 is 0, 1 or 2, preferably 0 or 1, more preferably 0. That is, —$SiR^a_kR^b_lR^c_m$ can be —$SiR^a_k$(—Z—$SiR^{13}_{r1}R^{14}_{s1}$)$_l$ (wherein k is an integer of 1 to 3, l is an integer of 0 to 2, r1 is an integer of 1 to 3, s1 is an integer of 0 to 2, and $R^a$, $R^{13}$, $R^{14}$, and Z have the same meaning as described above) In a preferable embodiment, —$SiR^a_kR^b_lR^c_m$ can be —$SiR^a_k$(—Z—$SiR^{13}_3$)$_l$ (wherein k is an integer of 1 to 3, preferably 2 or 3, more preferably 3, l is an integer of 0 to 2, preferably 0 or 1, more preferably 0, and $R^a$, $R^{13}$ and Z have the same meaning as described above).

In a preferable one embodiment, $X^1$ represents, each independently at each occurrence, —$CH_2CH_2$— or —$CH_2CH_2CH_2$—, more preferably —$CH_2CH_2CH_2$—, and the PFPE-containing silane compound represented by the formula (A1) or (A2) has the following formula (a1') or (a2') at a terminal.

  (a1')

wherein the sum of k, l and m is 3;
k is an integer of 1 to 3, and when k is 1, not only l is 1 or 2 and $R^b$ is represented by (—Z—$SiR^{11}_{p1}R^{13}_{r1}R^{14}_{s1}$), but also the sum of p1l, r1 and s1 is 3 and at least any of p1 or r1 is an integer of 1 to 3 in $R^b$,
more preferably k is 2 or 3,
further preferably k is 2 or 3, and when k is 2, l is 1 and r1 is an integer of 1 to 3,
particularly preferably k is 3,

  (a2')

wherein the sum of p1, q1, r1 and s1 is 3;
p1 is an integer of 1 to 3, and when p1 is 1, not only q1 is 1 or 2 and $R^{12}$ is represented by (—Z—$SiR^{11}_{p1}R^{13}_{r1}R^{14}_{s1}$), but also the sum of p1, r1 and s1 is 3 and at least any of p1 or r1 is an integer of 1 to 3 in $R^{12}$,
more preferably p1 is 2 or 3,
particularly preferably p1 is 3.

$X^1$ further preferably represents, each independently at each occurrence, —$CH_2CH_2$— or —$CH_2CH_2CH_2$—, more preferably —$CH_2CH_2CH_2$—, and the PFPE-containing silane compound represented by the formula (A1) or (A2) has the following (a1") or (a2") at a terminal.

  (a1")

wherein the sum of k and m is 3, and k is 2 or 3 and k is more preferably 3.

  (a2")

wherein the sum of p1, r1 and s1 is 3; p1 is 2 or 3, more preferably p1 is 2 and r1 is 1, or p1 is 3, particularly preferably p1 is 3.

In the embodiment, Z is preferably —$CH_2CH_2$—.

In a preferable one embodiment, $X^1$ represents, each independently at each occurrence, —$CH_2CH_2$— or —$CH_2CH_2CH_2$—, more preferably —$CH_2CH_2CH_2$—, r2 is 3, and more preferably p1 is 3 or k is 3.

The average molecular weight of the Rf-PFPE moiety in the PFPE-containing silane compound represented by the formula (A1) or formula (A2) is not limited, and is 500 to 30,000, preferably 1,500 to 30,000, more preferably 2,000 to 10,000.

The PFPE-containing silane compound of the present invention, represented by the formula (A1) or formula (A2), is not limited, and can have an average molecular weight of $5 \times 10^2$ to $1 \times 10^5$. Among such range, the compound preferably has an average molecular weight of 2,000 to 32,000, more preferably 2,500 to 12,000, from the viewpoint of friction durability. In the present invention, the "average molecular weight" refers to a number average molecular weight, and the "average molecular weight" is defined as a value obtained by $^{19}$F-NMR measurement, unless particularly noted.

The PFPE-containing silane compound of the present invention, represented by the formula (A1) or formula (A2), preferably has a number average molecular weight of 3,500 to 10,000, preferably has a number average molecular weight of 4,000 to 8,000, more preferably has a number average molecular weight of 4,000 to 6,500.

In one embodiment, the PFPE-containing silane compound of the present invention, represented by the formula (A1) or formula (A2), preferably has a number average molecular weight of 4,500 to 6,500, more preferably a number average molecular weight of 5,000 to 6,000.

In one embodiment, the PFPE-containing silane compound represented by the formula (A1) or formula (A2) can have a number average molecular weight of 1,000 to 40,000, preferably 1,000 to 32,000, more preferably 1,000 to 20,000, further more preferably 1,000 to 12,000.

In one embodiment, the proportion of a PFPE-containing silane compound having a molecular weight of 3,000 or less in the PFPE-containing silane compound represented by the formula (A1) or formula (A2) is 9% by mol or less.

The method for allowing the proportion of a PFPE-containing silane compound having a molecular weight of 3,000 or less in the total PFPE-containing silane compound in the surface-treating agent to be 9% by mol or less is not limited, and examples thereof include a method for removal of a low molecular weight compound by distillation or the like. Such distillation is preferably molecular distillation, and may be performed with respect to the PFPE-containing silane compound or may be performed with a raw material, for example, acid fluoride having PFPE. The distillation condition can be appropriately selected by those skilled in the art, depending on a compound as an object of such distillation.

The proportion of a PFPE-containing silane compound having a molecular weight of 3,000 or less in the total PFPE-containing silane compound in the surface-treating agent can be measured by GPC (gel permeation chromatography) analysis. Such GPC measurement can be performed by use of, for example, GPC max (HPLC system: manufactured by Malvern Instruments Ltd.) equipped with TDA-302 as a detector.

In the present embodiment, the molecular weight is measured by GPC (gel permeation chromatography) analysis.

In one embodiment, the PFPE-containing silane compound represented by the formula (A1) or formula (A2) has a weight average molecular weight in the range of 4000 to 6000, and has a weight average molecular weight/number average molecular weight in the range of 1.2 or less. The weight average molecular weight is measured by GPC (gel permeation chromatography) analysis.

Hereinafter, the method for producing the PFPE-containing silane compound of the present invention will be described.

The PFPE-containing silane compound represented by the formula (A1) or (A2) can be produced by, for example, the following method.

The PFPE-containing silane compound may be produced by a method including: Step (1): a step of reacting a compound represented by formula (A1-1) or (A2-1):

Rf-PFPE-X'—CH=CH$_2$     (A1-1)

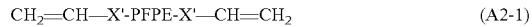
CH$_2$=CH—X'-PFPE-X'—CH=CH$_2$     (A2-1)

(wherein Rf and PFPE have the same meaning as described above, and X' represents a divalent organic group); with HSiM$_3$ (wherein M is each independently a halogen atom or a C$_{1-6}$ alkoxy group), thereby providing a compound represented by formula (A1-2) or formula (A1-2):

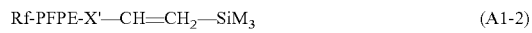
Rf-PFPE-X'—CH=CH$_2$—SiM$_3$     (A1-2)

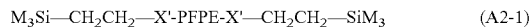
M$_3$Si—CH$_2$CH$_2$—X'-PFPE-X'—CH$_2$CH$_2$—SiM$_3$     (A2-1)

wherein Rf, PFPE, X' and M have the same meaning as described above;

Step (2): a step of reacting the compound represented by the formula (A1-2) or formula (A2-2) with a compound represented by formula: Hal-J-CH=CH$_2$ (wherein J represents Mg, Cu, Pd or Zn, and Hal represents a halogen atom.), and, if desired, a compound represented by formula: R$^c_{h'}$L (wherein R$^c$ has the same meaning as described above, L represents a group that can be bound to R$^c$, and h' is an integer of 1 to 3.), thereby providing a compound represented by formula (A1-3) or formula (A2-3):

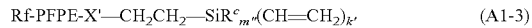
Rf-PFPE-X'—CH$_2$CH$_2$—SiR$^c_{m''}$(CH=CH$_2$)$_{k'}$     (A1-3)

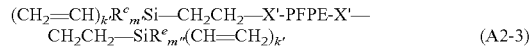
(CH$_2$=CH)$_{k'}$R$^c_m$Si—CH$_2$CH$_2$—X'-PFPE-X'—
CH$_2$CH$_2$—SiR$^c_{m''}$(CH=CH$_2$)$_{k'}$     (A2-3)

wherein Rf, PFPE, X' and R$^c$ have the same meaning as described above, m" is an integer of 1 to 3, k' is an integer of 1 to 3, and the sum of k' and m" is 3; and Step (3): a step of reacting a compound represented by formula (A1-3) or formula (A2-3) with HSiM$_3$ (wherein M is each independently a halogen atom or a C$_{1-6}$ alkoxy group), and, if desired, a compound represented by formula: R$^{23}_{i'}$L' (wherein R$^{23}$ has the same meaning as described above, L' represents a group that can be bound to R$^{23}$, and i' is an integer of 1 to 3.) and, if desired, a compound represented by formula: R$^{24}_{j'}$L" (wherein R$^{24}$ has the same meaning as described above, L" represents a group that can be bound to R$^{24}$, and j' is an integer of 1 to 3.).

The compound represented by formula (B1) or formula (B2) will be described.

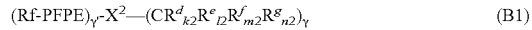
(Rf-PFPE)$_{\gamma'}$-X$^2$—(CR$^d_{k2}$R$^e_{l2}$R$^f_{m2}$R$^g_{n2}$)$_\gamma$     (B1)

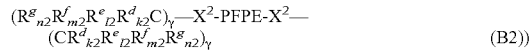
(R$^g_{n2}$R$^f_{m2}$R$^e_{l2}$R$^d_{k2}$C)$_\gamma$—X$^2$-PFPE-X$^2$—
(CR$^d_{k2}$R$^e_{l2}$R$^f_{m2}$R$^g_{n2}$)$_\gamma$     (B2))

Rf and PFPE have the same meaning as described above. Rf or PFPE in (A1) or (A2) may be here the same as or different from Rf or PFPE in (B1) or (B2).

In the formulae (B1) and (B2), X$^2$ represents, each independently at each occurrence, a single bond or a di- to decavalent organic group. X$^2$ is understood to be a linker for connecting a perfluoropolyether moiety (namely, Rf-PFPE moiety or -PFPE-moiety) that provides mainly water-repellency, surface lubricity, and the like, to a moiety (namely, group in parentheses with a symbol γ) that provides a binding ability to a base material, in the compound represented by formulae (B1) and (B2). Accordingly, X$^2$ may be an organic group as long as such the compound represented by formulae (B1) and (B2) can be exist.

The di- to decavalent organic group in $X^2$ is preferably a di- to heptavalent, more preferably di- to tetravalent, further preferably divalent organic group.

In the formula, γ is an integer of 1 to 9, and γ' is an integer of 1 to 9. Such γ and γ' may be varied depending on the valence of $X^2$. In the formula (B1), the sum of γ and γ' is the same as the valence of $X^2$. For example, when $X^2$ is a decavalent organic group, the sum of γ and γ' is 10, and, for example, γ is 9 and γ' is 1, γ is 5 and γ' is 5, or γ is 1 and γ' is 9. Alternatively, when $X^2$ is a divalent organic group, γ and γ' are each 1. In the formula (B2), γ is a value obtained by subtracting 1 from the valence of $X^2$.

In one embodiment, $X^2$ is a single bond or a di- to tetravalent organic group, γ is 1 to 3, and γ' is 1.

In another embodiment, $X^2$ is a single bond or a divalent organic group, γ is 1, and γ' is 1. In this case, the formulae (B1) and (B2) are represented by, the following formula (B1') and (B2'), respectively.

$$\text{Rf-PFPE-X}^2\text{—CR}^d_{k2}\text{R}^e_{l2}\text{R}^f_{m2}\text{R}^g_{n2} \quad \text{(B1')}$$

$$\text{R}^g_{n2}\text{R}^f_{m2}\text{R}^e_{l2}\text{R}^d_{k2}\text{C—X}^2\text{-PFPE-X}^2\text{—}\\\text{CR}^d_{k2}\text{R}^e_{l2}\text{R}^f_{m2}\text{R}^g_{n2} \quad \text{(B2')}$$

$X^2$ is not limited, and examples thereof include the same as described with respect to $X^1$.

Among them, preferable specific $X^2$ include a single bond,
—CH$_2$OCH$_2$—,
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_2$)$_2$Si(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$) CF$_2$OCF$_2$—,
—CH$_2$OCH$_2$CF$_2$CF$_2$OCF(CF$_3$) CF$_2$OCF$_2$CF$_2$—,
—CH$_2$OCH$_2$CF$_2$CF$_2$OCF(CF$_3$) CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$) CF$_2$OCF$_2$—,
—CH$_2$OCH$_2$CHFCF$_2$OCF(CF$_3$) CF$_2$OCF$_2$CF$_2$—,
—CH$_2$OCH$_2$CHFCF$_2$OCF(CF$_3$) CF$_2$OCF$_2$CF$_2$CF$_2$—,
—CH$_2$OCF$_2$CHFOCF$_2$CF$_2$CF$_2$—C(O)NH—CH$_2$—,
—CH$_2$OCH$_2$ (CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$ (CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CO—,
—CONH—,
—CONH—CH$_2$—,
—CONH—(CH$_2$)$_2$—,
—CONH—(CH$_2$)$_3$—,
—CON(CH$_3$)—(CH$_2$)$_3$—,
—CON(Ph)-(CH$_2$)$_3$— (wherein Ph means phenyl),
—CONH—(CH$_2$)$_6$—,
—CON(CH$_3$)—(CH$_2$)$_6$—,
—CON(Ph)-(CH$_2$)$_6$— (wherein Ph means phenyl),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$
—OCH$_2$—,
—O(CH$_2$)$_3$—,
—OCFHCF$_2$—,

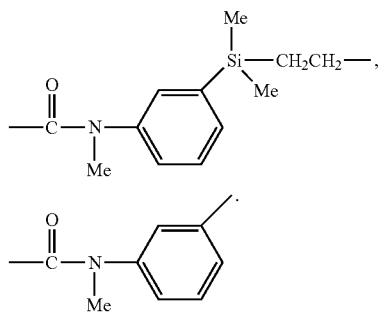

In a preferable embodiment, $X^2$ may be, each independently at each occurrence, a single bond, —CH$_2$—, —CH$_2$CH$_2$—, or —CH$_2$CH$_2$CH$_2$—.

In the formulae (B1) and (B2), $R^d$ represents, each independently at each occurrence, —CH$_2$CH$_2$— SiR$^{73}_{n4}$R$^{74}_{3-n4}$.

In the formula, $R^{73}$ represents a hydroxyl group or a hydrolyzable group. The hydrolyzable group has the same meaning as described above.

In the formula, $R^{74}$ represents a hydrogen atom or a monovalent organic group.

The monovalent organic group is preferably a group other than the hydrolyzable group.

The monovalent organic group is more preferably a lower alkyl group or a phenyl group, further preferably a lower alkyl group. The lower alkyl group is preferably an alkyl group having 1 to 20 carbon atoms, more preferably an alkyl group having 1 to 6 carbon atoms, further preferably a methyl group.

In the formula, n4 is, each independently at each occurrence, an integer of 1 to 3.

n4 is preferably 2 or more, more preferably 3.

In the formulae (B1) and (B2), $R^e$ represents, each independently at each occurrence, $-Y'-SiR^{83}_{n3}R^{84}_{3-n3}$.

Y' represents, each independently at each occurrence, a divalent organic group. The divalent organic group has the same meaning as described above.

Y' is more preferably a divalent organic group other than $-CH_2CH_2-$.

In a preferable embodiment, Y' is a $C_{1-6}$ alkylene group, $-(CH_2)_{g'}-O-(CH_2)_{h'}-$ (wherein g' is an integer of 0 to 6, for example, an integer of 1 to 6, h' is an integer of 0 to 6, for example, an integer of 1 to 6), or -phenylene-$(CH_2)_{i'}-$ (wherein i' is an integer of 0 to 6). Such groups may be substituted with one or more substituents selected from, for example, a fluorine atom, a $C_{1-6}$ alkyl group, a $C_{2-6}$ alkenyl group and a $C_{2-6}$ alkynyl group.

In one embodiment, Y' may be a $C_{1-6}$ alkylene group or -phenylene-$(CH_2)_{i'}-$. When Y' is the group as mentioned above, light resistance, particularly ultraviolet resistance may be more enhanced.

$R^{83}$ represents, each independently at each occurrence, a hydroxyl group or a hydrolyzable group. The hydrolyzable group has the same meaning as described above.

$R^{84}$ represents, each independently at each occurrence, a hydrogen atom or a monovalent organic group.

The monovalent organic group is preferably a group other than the hydrolyzable group.

The monovalent organic group is more preferably a lower alkyl group or a phenyl group, further preferably a lower alkyl group. The lower alkyl group is preferably an alkyl group having 1 to 20 carbon atoms, more preferably an alkyl group having 1 to 6 carbon atoms, further preferably a methyl group.

n3 is, each independently at each occurrence, an integer of 0 to 3.

n3 is preferably 2 or more, more preferably 3.

In the formulae (B1) and (B2), $R^f$ represents, each independently at each occurrence, $-Z'-CR^{61}_{p5}R^{62}_{q5}R^{63}_{r5}R^{64}_{s5}$.

In the formula, Z' has the same meaning as Z.

$R^{61}$ represents, each independently at each occurrence, $R^{d'}$. $R^{d'}$ has the same meaning as $R^d$.

$R^{62}$ represents, each independently at each occurrence, $-Y-SiR^{83}_{n3}R^{84}_{3-n3}$.

Y represents, each independently at each occurrence, a divalent organic group. The divalent organic group has the same meaning as described above.

Y is preferably a divalent organic group other than $-CH_2CH_2-$.

Y more preferably has the same meaning as Y'.

$R^{83}$, $R^{84}$ and n3 have the same meaning as described above.

$R^{63}$ represents, each independently at each occurrence, $R^{f'}$. $R^{f'}$ has the same meaning as $R^f$.

$R^{64}$ represents, each independently at each occurrence, a hydroxyl group, a hydrogen atom or a monovalent organic group.

The monovalent organic group is more preferably a lower alkyl group or a phenyl group, further preferably a lower alkyl group. The lower alkyl group is preferably an alkyl group having 1 to 20 carbon atoms, more preferably an alkyl group having 1 to 6 carbon atoms, further preferably a methyl group.

The number of C atoms linearly linked via a Z' group in $R^f$ is at most 5. That is, when at least one $R^{63}$ is present in $R^f$, two or more C atoms linearly linked via a Z' group are present in $R^f$, and the number of C atoms linearly linked via a Z' group is at most 5. The "number of C atoms linearly linked via a Z' group in Rf" is equal to the number of repeating units $-Z'-C-$ linearly linked in $R^f$.

In a preferable embodiment, the "number of C atoms linearly linked via the Z' group in $R^f$" is 1 (left formula) or 2 (right formula) in all chains, as described below.

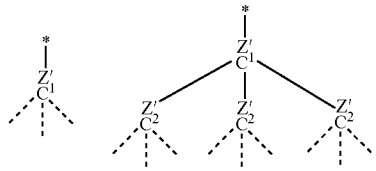

In one embodiment, the number of C atoms linearly linked via a Z' group in $R^f$ is 1 or 2, preferably 1.

In the formula, p5 is, each independently at each occurrence, an integer of 0 to 3; q5 is, each independently at each occurrence, an integer of 0 to 3; r5 is, each independently at each occurrence, an integer of 0 to 3; and s5 is, each independently at each occurrence, an integer of 0 to 3, provided that the sum of p5, q5, r5, and s5 in each $-Z'-CR^{61}_{p5}R^{62}_{q5}R^{63}_{r5}R^{64}_{s5}$ is 3.

In another preferable embodiment, r5 is 0, and p5 is preferably 1 or more, more preferably 2 or more, further preferably 3, in each $-Z'-CR^{61}_{p5}R^{62}_{q5}R^{63}_{r5}R^{64}_{s5}$ in $R^f$ or $R^{f'}$. When p5 is 1 or 2, preferably, the sum of p5 and q5 is 3, and n3 in $R^{62}$ is an integer of 1 to 3.

In another preferable embodiment, p5 in $R^{f'}$ ($R^f$ when $R^{f'}$ is absent) at a terminal in $R^f$ is preferably 2 or more, for example, 2 or 3, more preferably 3.

$R^{f'}$ and $R^f$ at a terminal mean $R^{f'}$ and $R^f$ where r5 is 0, respectively.

$R^g$ represents, each independently at each occurrence, a hydrogen atom, a hydroxyl group, or a monovalent organic group, in the formulae (B1) and (B2). The monovalent organic group has the same meaning as described above.

k2 is, each independently at each occurrence, an integer of 0 to 3; l2 is, each independently at each occurrence, an integer of 0 to 3; m2 is, each independently at each occurrence, an integer of 0 to 3; and n2 is, each independently at each occurrence, an integer of 0 to 3, provided that the sum of k2, l2, m2 and n2 in each $-CR^d_{k2}R^e_{l2}R^f_{m2}R^g_{n2}$ is 3, in the formulae (B1) and (B2).

At least one $R^d$ or $R^{d'}$ is present and at least two groups represented by $-SiR^{73}$ or $-SiR^{83}$ are present in the formulae (B1) and (B2).

In one embodiment, at least two $R^d$ or $R^{d'}$ are present and at least two groups represented by $-SiR^{73}$ or $-SiR^{83}$ are present in the formulae (B1) and (B2).

In one embodiment, in the formulae (B1) and (B2), a C atom to which at least one $R^d$ or $R^{d'}$ is bound and to which $R^e$ or $R^{62}$ comprising at least $R^{83}$ is optionally further bound, in which the sum of $R^d$, $R^{d'}$, $R^e$ and $R^{62}$ is 2 or more, can be present.

In one embodiment, at least one k2 is 2 or 3, preferably 3. In such an embodiment, m2 may be 0 in $-CR^d_{k2}R^e_{l2}R^f_{m2}R^g_{n2}$ where k2 is 2. That is, $-CR^d_{k2}R^e_{l2}R^f_{m2}R^g_{n2}$ can be $-CR^d_2R^e_{l2}R^g_{n2}$. In such an embodiment, preferably, m2 is 0, l2 is 1, and n2 is 0, in $-CR^d_{k2}R^e_{l2}R^f_{m2}R^g_{n2}$ where k2 is 2. That is, preferably $-CR^d_{k2}R^e_{l2}R^f_{m2}R^g_{n2}$ may be $-CR^d_2R^e$.

In one embodiment, k2 is 2 or 3, preferably 3. In such an embodiment, m2 may be 0 in $-CR^d_{k2}R^e_{l2}R^f_{m2}R^g_{n2}$ where k2 is 2. That is, $-CR^d_{k2}R^e_{l2}R^f_{m2}R^g_{n2}$ can be $-CR^d_2R^e_{l2}R^g_{n2}$. In such an embodiment, preferably, m2 is 0, l2 is 1, and n2 is 0, in $-CR^d_{k2}R^e_{l2}R^f_{m2}R^g_{n2}$ where k2 is 2. That is, preferably, $-CR^d_{k2}R^e_{l2}R^f_{m2}R^g_{n2}$ may be $-CR^d_2R^e$.

The perfluoro(poly)ether group-containing silane compound of the present invention, represented by the formula (B1) or (B2), may have the above structure, particularly, $R^d$ or $R^{d'}$, thereby contributing to formation of a surface-treating layer which has more UV resistance and which is more favorable in durability to acid or alkali.

In one embodiment, the formulae (B1) and (B2) may have a group represented by the following formula (b1) at a terminal.

$CR^d_{k2}R^e_{l2}R^f_{m2}R^g_{n2}$ (b1)

wherein $R^f$ represents $-Z'-CR^{61}_{p5}R^{62}_{q5}R^{63}_{r5}R^{64}_{s5}$;
the sum of k2 and p5 is 1 or more, preferably 2 or more, more preferably any of k2 or p5 is 3; and
provided that, when the sum of k2 and p5 is 1, the sum of l2 and q5 is 1 or more and n3 in $R^e$ and $R^{62}$ is an integer of 1 to 3.

More preferably, the formulae (B1) and (B2) have a group represented by the following formula (b2), at a terminal.

$-CR^d_{k2}R^e_{l2}R^g_{n2}$ (b2)

wherein the sum of k2, l2 and n2 is 3;
k2 is an integer of 1 to 3, preferably 2 or 3, more preferably 3; and
when k2 is 1, l2 is 1 or 2, and n3 in $R^e$ is an integer of 1 to 3.

The formulae (B1) and (B2) further preferably have a group represented by the following formula (b3), at a terminal.

$-CR^d_{k2}R^e_{l2}$ (b3)

wherein the sum of k2 and l2 is 3, and k2 is 2 or 3 and k2 is more preferably 3; and
n3 is preferably an integer of 1 to 3 in $R^e$.

In another embodiment, the formulae (B1) and (B2) have a group represented by the following formula (b4), at a terminal.

$-CR^d_{k2}R^g_{n2}$ (b4)

wherein the sum of k2 and n2 is 3, and k2 is 2 or 3 and k2 is more preferably 3.

It is preferably that $R^d$ is represented by $-CH_2CH_2-SiR^{73}_{n4}R^{74}_{3-n4}$ and n4 is 3, in the formulae (b1) to (b4).

In another preferable embodiment, in at least one, preferably all $-CR^d_{k2}R^e_{l2}R^f_{m2}R^g_{n2}$, each independently, k2 is 1, 2 or 3, preferably 2 or 3, more preferably 3, l2 is 0, 1 or 2, preferably 0 or 1, more preferably 0, m2 is 0, 1 or 2, preferably 0 or 1, more preferably 0, n2 is 0, and when $R^f$ is present, $R^f$ is $-Z'-CR^{61}_{p5}R^{62}_{q5}$, p5 is 1, 2 or 3, preferably 2 or 3, more preferably 3, the sum of p5 and q5 is 3, and at least two groups each represented by $-SiR^{73}$ or $-SiR^{83}$ are present. That is, it is preferable that $-CR^d_{k2}R^e_{l2}R^f_{m2}R^g_{n2}$ is $-CR^d_{k2}R^e_{l2}(-Z'-CR^{61}_{p5}R^{62}_{q5})_{m2}$ (wherein k2 is an integer of 1 to 3, l2 is an integer of 0 to 2, m2 is an integer of 0 to 2, the sum of k2, l2 and m2 is 3, p5 is an integer of 1 to 3, and the sum of p5 and q5 is 3.) and at least two groups each represented by $-SiR^{73}$ or $-SiR^{83}$ are present ($R^d$, $R^e$, Z', $R^{61}$, $R^{62}$, $R^{73}$, and $R^{83}$ have the same meaning as described above.).

In a preferable one embodiment, $X^2$ is, each independently at each occurrence, a single bond, $-CH_2-$, $-CH_2CH_2-$, or $-CH_2CH_2CH_2-$; the formulae (B1) and (B2) have the group represented by the formula (b1), at a terminal, preferably have the group represented by the formula (b2), at a terminal, further preferably have the group represented by the formula (b3). $R^d$ is preferably represented by $-CH_2CH_2-SiR^{73}_{n4}R^{74}_{3-n4}$ and n4 is preferably 3, in the formulae (b1) to (b3).

In a more preferable one embodiment, $X^2$ represents, each independently at each occurrence, a single bond, $-CH_2-$, $-CH_2CH_2-$, or $-CH_2CH_2CH_2-$; and n4 is 3 and k2 is 3 or p5 is 3.

The average molecular weight of the Rf-PFPE moiety in the PFPE-containing silane compound represented by the formula (B1) or formula (B2) is not limited, and is 500 to 30,000, preferably 1,500 to 30,000, more preferably 2,000 to 10,000.

In one embodiment, the number average molecular weight of the Rf-PFPE-moiety or the -PFPE-moiety in the PFPE-containing silane compound represented by the formula (B1) or formula (B2) is preferably 2,500 to 6,000, more preferably 3,000 to 5,500, further preferably 3,000 to 4,000.

The PFPE-containing silane compound represented by the formula (B1) or formula (B2) can have an average molecular weight of $5 \times 10^2$ to $1 \times 10^5$, but is not limited. Among such range, the compound preferably has an average molecular weight of 2,000 to 32,000, more preferably 2,500 to 12,000, from the viewpoint of friction durability. In the present invention, the "average molecular weight" refers to a number average molecular weight, and the "average molecular weight" is defined as a value obtained by $^{19}$F-NMR measurement, unless particularly noted.

The PFPE-containing silane compound represented by the formula (B1) or formula (B2) preferably has a number average molecular weight of 3,000 to 6,000 and preferably has a number average molecular weight of 3,000 to 4,500.

In one embodiment, the PFPE-containing silane compound represented by the formula (B1) or formula (B2) can have a number average molecular weight of 1,000 to 30,000, preferably 1,000 to 30,000, more preferably 1,000 to 30,000, further more preferably 1,000 to 10,000.

In one embodiment, the proportion of a PFPE-containing silane compound having a molecular weight of 3,000 or less in the PFPE-containing silane compound represented by the formula (B1) or formula (B2) is 9% by mol or less.

The method for allowing the proportion of a PFPE-containing silane compound having a molecular weight of 3,000 or less in the total PFPE-containing silane compound in the surface-treating agent to be 9% by mol or less is not limited, and examples thereof include a method for removal of a low molecular weight compound by distillation or the like. Such distillation is preferably molecular distillation, and may be performed with respect to the PFPE-containing silane compound or may be performed with a raw material, for example, acid fluoride having PFPE. The distillation condition can be appropriately selected by those skilled in the art, depending on a compound as an object of such distillation.

The proportion of a PFPE-containing silane compound having a molecular weight of 3,000 or less in the total PFPE-containing silane compound in the surface-treating agent can be measured by GPC (gel permeation chromatography) analysis. Such GPC measurement can be performed by use of, for example, GPC max (HPLC system: manufactured by Malvern Instruments Ltd.) equipped with TDA-302 as a detector.

In the present embodiment, the molecular weight is measured by GPC (gel permeation chromatography) analysis.

In one embodiment, the PFPE-containing silane compound represented by the formula (B1) or formula (B2) has a weight average molecular weight in the range of 4,000 to 6,000 and a weight average molecular weight/number average molecular weight in the range of 1.2 or less. The weight average molecular weight is measured by GPC (gel permeation chromatography) analysis.

The PFPE-containing silane compound represented by the formula (B1) or formula (B2) can be produced by a combination of known methods.

[Surface-Treating Agent]

Next, the surface-treating agent of the present invention will be described.

The surface-treating agent of the present invention contains at least one PFPE-containing silane compound represented by the formula (A1), (A2), (B1) or (B2).

In one embodiment, the surface-treating agent of the present invention contains at least one PFPE-containing silane compound represented by the formula (A1) or formula (A2).

In one embodiment, the surface-treating agent of the present invention contains at least one PFPE-containing silane compound represented by the formula (B1) or formula (B2).

The surface-treating agent of the present invention may impart water-repellency, oil-repellency, antifouling property, surface lubricity, and friction durability to a base material, is not limited, and may be suitably used as an antifouling coating agent or a water-proof coating agent.

The surface-treating agent of the present invention preferably includes 0.01 to 100 parts by mass, more preferably 0.1 to 30 parts by mass of the PFPE-containing silane compound based on 100 parts by mass of the surface-treating agent.

For example, the surface-treating agent of the present invention may be diluted with a solvent. Such a solvent is not limited, and examples thereof include:

a fluorine atom-containing solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluoro cyclopentane ((Zeorora H (trade name) and the like), $C_4F_9OCH_3$, $C_4F_9OC_2H_5$, $CF_3CH_2OCF_2CHF_2$, $C_6F_{13}CH{=}CH_2$, xylene hexafluoride, perfluorobenzene, methyl pentadecafluoroheptyl ketone, trifluoroethanol, pentafluoropropanol, hexafluoroisopropanol, $HCF_2CF_2CH_2OH$, methyl trifluoromethanesulfonate, trifluoroacetic acid and $CF_3O(CF_2CF_2O(CF_2CF_2O)_{m1}(CF_2O)_{n1}CF_2CF_3$: wherein m1 and n1 are each independently an integer of 0 or more and 1000 or less, and the occurrence order of respective repeating units in parentheses with a symbol m1 or n1 is not limited in the formula, provided that the sum of m1 and n1 is 1 or more; 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,3,3-trifluoro-1-propene, and 1,1,1,4,4,4-hexafluoro-2-butene.

$C_6F_{13}OCH_3$ may be used as the solvent.

The water content in the solvent is preferably 20 ppm or less in terms of the mass. The water content can be measured by use of the Karl Fischer method. The water content can be within the range, thereby resulting in an enhancement in storage stability of the surface-treating agent.

For example, the surface-treating agent of the present invention may further include other components. Such other components are not limited, and examples thereof include other surface treatment compounds, a (non-reactive) fluoropolyether compound that can be understood as a fluorine-containing oil, preferably a perfluoro(poly)ether compound (hereinafter, referred to as a "fluorine-containing oil"), a (non-reactive) silicone compound that can be understood as a silicone oil (hereinafter, referred to as a "silicone oil"), an alcohol, a catalyst, a transition metal, a halide ion, and a compound containing an atom having an unshared electron pair in a molecular structure.

The fluorine-containing oil is not limited, and examples thereof include a compound (perfluoro(poly)ether compound) represented by the following general formula (1):

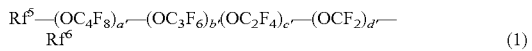

(1)

In the formula, $Rf^5$ represents an alkyl group having 1 to 16 carbon atoms optionally substituted with one or more fluorine atoms (preferably $C_{1-16}$ perfluoroalkyl group), $Rf^6$ represents an alkyl group having 1 to 16 carbon atoms optionally substituted with one or more fluorine atoms (preferably $C_{1-16}$ perfluoroalkyl group), a fluorine atom, or a hydrogen atom, and $Rf^5$ and $Rf^6$ more preferably each independently are a $C_{1-3}$ perfluoroalkyl group.

In the formula, a', b', c' and d' represent the numbers of four types of repeating units of perfluoro(poly)ether forming a main backbone of a polymer, respectively, and are, independently of each other, an integer of 0 or more and 300 or less, and the sum of a', b', c' and d' is at least 1, preferably 1 to 300, more preferably 20 to 300. The occurrence order of respective repeating units in parentheses with a suffix a', b', c' or d' is not limited in the formula. In these repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, and is preferably —(OCF$_2$CF$_2$CF$_2$CF$_2$)—; —(OC$_3$F$_6$)— may be any of —(OCF$_2$CF$_2$CF$_2$)—, —(OCF(CF$_3$)CF$_2$)— and —(OCF$_2$CF(CF$_3$))—, and is preferably —(OCF$_2$CF$_2$CF$_2$)—; and —(OC$_2$F$_4$)— may be any of —(OCF$_2$CF$_2$)— and —(OCF(CF$_3$))—, and is preferably —(OCF$_2$CF$_2$)—.

Examples of the perfluoro(poly)ether compound represented by the general formula (1) include a compound (for example, which may be a single compound or a combination of two or more kinds) represented by any of the following general formulae (1a) and (1b):

(1a)

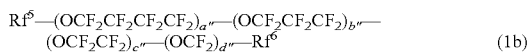

(1b)

In the formulae, $Rf^5$ and $Rf^6$ are as described above; in the formula (1a), b" is an integer of 1 or more and 100 or less; and in the formula (1b), a" and b" are each independently an integer of 1 or more and 30 or less, and c" and d" are each independently an integer of 1 or more and 300 or less. The occurrence order of respective repeating units in parentheses with a suffix a''', b'', c'', or d'' is not limited in the formula.

For example, the fluorine-containing oil may have an average molecular weight of 1,000 to 30,000. Thus, high surface lubricity may be obtained.

The content of the fluorine-containing oil in the surface-treating agent of the present invention can be, for example, 0 to 500 parts by mass, preferably 0 to 400 parts by mass, more preferably 5 to 300 parts by mass based on 100 parts by mass in total of the perfluoro(poly)ether group-containing silane compound and the carboxylate ester compound (when two or more kinds of such respective oils are contained, the content means the total content of such oils, much the same is true on the following).

For example, the compound represented by the general formula (1a) and the compound represented by the general formula (1b) may be each used singly or in combinations of two or more kinds. The compound represented by the general formula (1b) is more preferably used than the compound represented by the general formula (1a) because higher surface lubricity is obtained. When the compound represented by the general formula (1a) and the compound represented by the general formula (1b) are used in a combination, the mass ratio thereof is preferably 1:1 to 1:30, more preferably 1:1 to 1:10. When the mass ratio is within the range, a surface-treating layer satisfying surface lubricity and friction durability in a well-balanced manner may be obtained.

In one embodiment, the fluorine-containing oil includes at least one compound represented by the general formula (1b). In such an embodiment, the mass ratio of the perfluoro(poly)ether group-containing silane compound and the compound represented by the formula (1b) in the surface-treating agent is preferably 10:1 to 1:10, more preferably 4:1 to 1:4.

In one embodiment, the average molecular weight of the compound represented by the formula (1a) is preferably 2,000 to 8,000.

In one embodiment, the average molecular weight of the compound represented by the formula (1b) is preferably 8,000 to 30,000.

In another embodiment, the average molecular weight of the compound represented by the formula (1b) is preferably 3,000 to 8,000.

In a preferable embodiment, when the surface-treating layer is formed by a vacuum deposition method, for example, the number average molecular weight of the fluorine-containing oil may be higher than the number average molecular weight of the perfluoro(poly)ether group-containing silane compound. For example, the number average molecular weight of the fluorine-containing oil may be higher than the number average molecular weight of the perfluoro(poly)ether group-containing silane compound by 2,000 or more, preferably 3,000 or more, more preferably 5,000 or more. By selecting such these number average molecular weights, more excellent friction durability and surface lubricity can be obtained.

For example, the fluorine-containing oil may be a compound represented by general formula Rf'—F: wherein Rf' is $C_{5-16}$ perfluoroalkyl group; from another viewpoint. For example, the fluorine-containing oil may be a chlorotrifluoroethylene oligomer. The compound represented by Rf'—F and the chlorotrifluoroethylene oligomer are preferable because these compounds have high affinity with a perfluoro(poly)ether group-containing silane compound where Rf is a $C_{1-16}$ perfluoroalkyl group.

The fluorine-containing oil contributes to an enhancement in surface lubricity of the surface-treating layer.

For example, a linear or cyclic silicone oil having 2,000 or less siloxane bonds can be used as the silicone oil. For example, the linear silicone oil may be any of so-called straight silicone oil and modified silicone oil. Examples of the straight silicone oil include dimethyl silicone oils, methyl phenyl silicone oils, and methyl hydrogen silicone oils. Examples of the modified silicone oil include straight silicone oils modified by alkyl, aralkyl, polyether, higher fatty acid ester, fluoroalkyl, amino, epoxy, carboxyl, alcohol, or the like. Examples of the cyclic silicone oil include cyclic dimethyl siloxane oils.

The content of such a silicone oil in the surface-treating agent of the present invention can be, for example, 0 to 300 parts by mass, preferably 0 to 200 parts by mass based on 100 parts by mass of the total of the PFPE-containing silane compound (when two or more kinds of such oils are contained, the content means the total content of such oils, much the same is true on the following).

The silicone oil contributes to an enhancement in surface lubricity of the surface-treating layer.

Examples of the catalyst include acids (for example, acetic acid and trifluoroacetic acid), bases (for example, ammonia, triethylamine, and diethylamine), and transition metals (for example, Ti, Ni, and Sn).

The catalyst promotes hydrolysis and dehydration condensation of the perfluoro(poly)ether group-containing silane compound, and promotes formation of the surface-treating layer.

Examples of the transition metal include platinum, ruthenium, and rhodium.

Examples of the halide ion include chloride ion.

The compound containing an atom having an unshared electron pair in a molecular structure preferably contains at least one atom selected from the group consisting of a nitrogen atom, an oxygen atom, a phosphorus atom, and a sulfur atom, more preferably a sulfur atom or a nitrogen atom.

The compound containing an atom having an unshared electron pair in a molecular structure preferably contains at least one functional group selected from the group consisting of an amino group, an amide group, a sulfinyl group, a P=O group, a S=O group, and a sulfonyl group, more preferably at least one functional group selected from the group consisting of a P=O group, and a S=O group, in a molecular structure.

The compound containing an atom having an unshared electron pair in a molecular structure is preferably at least one compound selected from the group consisting of an aliphatic amine compound, an aromatic amine compound, an amide phosphate compound, an amide compound, a urea compound, and a sulfoxide compound, more preferably at least one compound selected from the group consisting of an aliphatic amine compound, an aromatic amine compound, amide phosphate, a urea compound, and a sulfoxide compound, particularly preferably at least one compound selected from the group consisting of a sulfoxide compound, an aliphatic amine compound and an aromatic amine compound, further preferably a sulfoxide compound.

Examples of the aliphatic amine compound can include diethylamine and triethylamine. Examples of the aromatic amine compound can include aniline and pyridine. Examples of the amide phosphate compound can include hexamethylphosphoramide. Examples of the amide compound can include N,N-diethylacetamide, N,N-diethylformamide, N,N-dimethylacetamide, N-methylformamide, N,N-dimethylformamide, and N-methylpyrrolidone. Examples of the urea compound can include tetramethylurea. Examples of the sulfoxide compound can include dimethylsulfoxide (DMSO), tetramethylenesulfoxide, methylphenylsulfoxide, and diphenylsulfoxide. Among these compounds, dimethylsulfoxide or tetramethylenesulfoxide is preferably used.

Examples of any component other than the above also include tetraethoxysilane, methyltrimethoxysilane, 3-aminopropyltrimethoxysilane, 3-glycidoxypropyltrimethoxysilane, and methyltriacetoxysilane.

Examples of any component other than the above include an alcohol compound having 1 to 6 carbon atoms.

[Pellet]

The surface-treating agent of the present invention can be used for impregnation of a porous material such as a porous ceramic material, or a metal fiber for example that obtained by solidifying a steel wool to obtain a pellet. The pellet can be used in, for example, vacuum deposition.

The surface-treating agent of the present invention is suitably used as a surface-treating agent because it can impart water-repellency, oil-repellency, antifouling property, waterproof property, high friction durability, and UV resistance to a base material. Specifically, the surface-treating agent of the present invention is not limited, and can be suitably used as an antifouling coating agent or a waterproof coating agent.

[Article]

Next, the article of the present invention will be described.

The article of the present invention includes a base material, and a layer (surface-treating layer) formed from the surface-treating agent of the present invention, on a surface of the base material. The article can be produced as follows, for example.

First, a base material is prepared. For example, the base material usable in the present invention may be composed of, for example, any suitable material such as glass, a resin (for example, which may be a natural or synthetic resin such as a general plastic material, and may be in the form of a plate, a film or the like), a metal (for example, which may be a metal itself, such as aluminum, copper, or iron, or a composite such as an alloy), ceramics, a semiconductor (silicon, germanium, or the like), a fiber (woven fabric, unwoven cloth, or the like), fur, leather, a wood material, a pottery, a stone material, or a building component.

The glass is preferably sapphire glass, soda lime glass, alkali aluminosilicate glass, borosilicate glass, alkali-free glass, crystal glass, or quartz glass, particularly preferably soda lime glass chemically reinforced, alkali aluminosilicate glass chemically reinforced, and borosilicate glass chemically bound.

The resin is preferably an acrylic resin, polycarbonate, or the like.

For example, when the article to be produced is an optical member, for example, the material composing the surface of the base material may be a material for optical members, such as glass or transparent plastic. When the article to be produced is an optical member, for example, any layer (or film) such as a hard coating layer or an antireflection layer may be formed on the surface (outermost layer) of the base material. Any of a monolayer antireflection layer and a multilayer antireflection layer may be used for the antireflection layer. Examples of an inorganic substance usable for the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$. Such inorganic substances may be used singly or in combinations (for example, as a mixture) of two or more kinds thereof. When a multilayer antireflection layer is used, $SiO_2$ and/or SiO are/is preferably used for the outermost layer. When the article to be produced is an optical glass component for a touch panel, the article may have a transparent electrode, for example, a thin film using indium tin oxide (ITO), indium zinc oxide, or the like, on a part of the surface of the base material (glass). The base material may have an insulating layer, an adhesive layer, a protecting layer, a decorated frame layer (I-CON), a sprayed film layer, a hard coating layer, a polarizing film, a phase difference film, and a liquid crystal display module, depending on the specific specifications.

The shape of the base material is not limited. A surface region of the base material, on which the surface-treating layer is to be formed, may be at least a part of the surface of the base material, and can be appropriately determined depending on the intended use, the specific specifications, and the like of the article to be produced.

For example, at least the surface portion of such a base material may consist of a material originally having a hydroxyl group. Examples of such a material include glass, and also include a metal on which a natural oxidized film or a thermal oxidized film is formed (in particular, base metal), a ceramic, and a semiconductor. Alternatively, as in a resin or the like, when the material is a material having a hydroxyl group, but not sufficiently having such a group, or a material not originally having any hydroxyl group, any pre-treatment of the base material can be conducted to thereby introduce a hydroxyl group onto the surface of the base material or increase the amount of a hydroxyl group on the surface. Examples of such a pre-treatment include a plasma treatment (for example, corona discharge) and ion beam irradiation. A plasma treatment can be suitably utilized in order to not only introduce a hydroxyl group onto the surface of the base material or increase the amount of a hydroxyl group on the surface, but also clean the surface of the base material (remove foreign substances or the like). Other examples of such a pre-treatment include a method where a monomolecular film of a surface adsorbent having a carbon-carbon unsaturated bond group is previously formed on the surface of the base material by a LB method (Langmuir-Blodgett method) or a chemical adsorption method and thereafter the unsaturated bond is cleaved under an atmosphere containing oxygen, nitrogen, and the like.

Alternatively, such a base material may be that of which at least the surface consists of a material comprising other reactive group(s) such as a silicone compound having one or more Si—H groups or alkoxysilane.

Next, a film of the surface-treating agent of the present invention is formed on the surface of such a base material, and is, if necessary, subjected to a post-treatment, and thus the surface-treating layer is formed from the surface-treating agent of the present invention.

The film of the surface-treating agent of the present invention can be formed by applying the surface-treating agent of the present invention onto the surface of the base material so that the surface is coated. The coating method is not limited. For example, a wet coating method and a dry coating method can be used.

Examples of the wet coating method include dip coating, spin coating, flow coating, spray coating, roll coating, gravure coating, and a similar method.

Examples of the dry coating method include deposition (usually vacuum deposition), sputtering, CVD, and a similar method. Specific examples of a deposition method (usually vacuum deposition method) include resistance heating, electron beam, high-frequency heating using microwave or the like, ion beam, and a similar method. Specific examples of a CVD method include plasma-CVD, optical CVD, thermal CVD, and a similar method.

Furthermore, coating can be performed by an atmospheric pressure plasma method.

When the wet coating method is used, the surface-treating agent of the present invention can be diluted with a solvent and then applied to the surface of the base material. The following solvents are preferably used from the viewpoints of stability of the surface-treating agent of the present invention and volatility of such a solvent: $C_{5-12}$ perfluoroaliphatic hydrocarbons (for example, perfluorohexane, perfluoromethyl cyclohexane, and perfluoro-1,3-dimethyl cyclohexane); polyfluoroaromatic hydrocarbons (for example, bis(trifluoromethyl)benzene); polyfluoroaliphatic hydrocarbons (for example, $C_6F_{13}CH_2CH_3$ (for example, Asahiklin (registered trademark) AC-6000 manufactured by Asahi Glass Co., Ltd.) and 1,1,2,2,3,3,4-heptafluoro cyclopentane (for example, Zeorora (registered trademark) H manufactured by Nippon Zeon Co., Ltd.); a hydrofluorocarbon (HFC) (for example, 1,1,1,3,3-pentafluorobutane (HFC-365mfc)); a hydrochlorofluorocarbon (for example, HCFC-225 (Asahiklin (registered trademark) AK225)); a hydrofluoroether (HFE) (for example, an alkyl perfluoroalkyl ether such as perfluoropropyl methyl ether ($C_3F_7OCH_3$) (for example, Novec (trade name) 7000 manufactured by Sumitomo 3M Ltd.), perfluorobutylmethyl ether ($C_4F_9OCH_3$) (for example, Novec (trade name) 7100 manufactured by Sumitomo 3M Ltd.), perfluorobutylethyl ether ($C_4F_9OC_2H_5$) (for example, Novec (trade name) 7200 manufactured by Sumitomo 3M Ltd.), and perfluorohexyl methyl ether ($C_2F_5CF$ $(OCH_3)C_3F_7$) (for example, Novec (trade name) 7300 manufactured by Sumitomo 3M Ltd.) (perfluoroalkyl group and alkyl group may be linear or branched)), or $CF_3CH_2OCF_2CHF_2$ (for example, Asahiklin (registered trademark) AE-3000 manufactured by Asahi Glass Co., Ltd.) and 1,2-dichloro-1,3,3,3-tetrafluoro-1-propene (for example, Vertrel (registered trademark) Sion manufactured by Dupont-Mitsui Fluorochemicals Co., Ltd.). Such solvents may be used singly or as a mixture of two or more kinds combined. Furthermore, for example, such solvents can also be mixed with another solvent in order to adjust the solubilities of the perfluoro(poly)ether group-containing silane compound and a perfluoropolyether-modified compound and the like.

When the dry coating method is used, the surface-treating agent of the present invention may be subjected, as it is, to the dry coating method, or may be diluted with the solvent and then subjected to the dry coating method.

Film formation is preferably performed so that the surface-treating agent of the present invention coexists with a catalyst for hydrolysis and dehydration condensation in the film. Briefly, in the case of the wet coating method, for example, the surface-treating agent of the present invention may be diluted with the solvent and thereafter the catalyst may be added to a diluted liquid of the surface-treating agent of the present invention immediately before application to the surface of the base material. In the case of the dry coating method, for example, the surface-treating agent of the present invention, to which the catalyst is added, may be subjected, as it is, to a deposition (usually vacuum deposition) treatment, or pellets may be used in the deposition (usually vacuum deposition), wherein the pellets is obtained by impregnating a metal porous material such as iron or copper with the surface-treating agent of the present invention to which the catalyst has been added.

Any suitable acid or base can be used for the catalyst. For example, acetic acid, formic acid, or trifluoroacetic acid can be used as an acid catalyst. For example, ammonia or an organic amine compound can be used as a base catalyst.

Next, the film is subjected to a post-treatment, if necessary. The post-treatment is not limited, and for example, may be performed by sequentially feeding water, and performing drying and heating, and more specifically may be performed as follows.

After the film of the surface-treating agent of the present invention is formed on the surface of the base material as described above, water is fed to the film (hereinafter, also referred to as "precursor film"). The method of supplying water is not limited, and for example, a method such as dew condensation due to the temperature difference between the precursor coating (and base material) and the ambient atmosphere, or spraying of water vapor (steam) may be used.

Water can be supplied under an atmosphere at, for example, 0 to 250° C., preferably 60° C. or more, further preferably 100° C. or more, and preferably 180° C. or less, further preferably 150° C. or less. Water can be supplied in such a temperature range, thereby allowing for progression of hydrolysis. The pressure here is not limited, and can be simply ambient pressure.

Next, the precursor coating is heated on the surface of the base material under a dry atmosphere at more than 60° C. The drying and heating method is not limited, and for example, the precursor film together with the base material may be disposed under an atmosphere at a temperature of more than 60° C., preferably more than 100° C., and for example, 250° C. or less, preferably 180° C. or less, and at an unsaturated water vapor pressure. The pressure here is not limited, and can be simply ambient pressure.

Under such an atmosphere, groups bonding to Si after hydrolysis are mutually rapidly dehydrated and condensed with each other between the perfluoro(poly)ether group-containing silane compound of the present invention. A group binding to Si after hydrolysis of the compound and a reactive group present in the surface of the base material are rapidly reacted between the compound and the base material, and are dehydrated and condensed when the reactive group present in the surface of the base material is a hydroxyl group. As a result, the bond between the perfluoro(poly)ether group-containing silane compound and the base material is formed.

The above supplying of water, and the drying and heating may be sequentially performed by using of superheated water vapor.

The post-treatment can be performed as described above. Such a post-treatment can be performed in order to further enhance friction durability, but it is to be noted that such a post-treatment is not essential for production of the article of the present invention. For example, the surface-treating agent of the present invention may also be applied to the surface of the base material and then left to stand as it is.

As described above, the surface-treating layer derived from the film of the surface-treating agent of the present invention is formed on the surface of the base material, and the article of the present invention is produced. The surface-treating layer thus obtained has favorable UV resistance. The surface-treating layer can have not only favorable UV resistance, but also water-repellency, oil-repellency, antifouling property (for example, prevention of attachment of contaminations such as fingerprints), surface lubricity (or lubricity, for example, wiping property of contaminations such as fingerprints, or excellent texture to fingers), high friction durability, and the like, depending on the formulation of a composition used, and can be suitably utilized as a functional thin film.

That is, the present invention also relates to an optical material including the cured product on the outermost layer.

Examples of the optical material preferably include not only optical materials related to a display and the like recited below, but also various optical materials: for example, displays such as a cathode ray tube (CRT; e.g., TV, personal computer monitor), a liquid crystal display, a plasma display, an organic EL display, an inorganic thin-film EL dot matrix display, a rear projection display, a vacuum fluorescent display (VFD), and a field emission display (FED; Field Emission Display), and protective plates of such displays, or such protective plates each provided with a surface onto which an antireflection film is applied.

An article including the surface-treating layer obtained by the present invention is not limited, and can be an optical member. Examples of the optical member include the following: lenses for eyeglasses; a front surface protective plate, an antireflection plate, a polarizing plate, and an anti-glare plate for displays such as PDP and LCD; a touch panel sheet for devices such as a cellular phone and a personal digital assistance; a disc surface for optical discs such as a Blu-ray (registered trademark) disc, a DVD disc, CD-R, and MO; and an optical fiber.

For example, the article including the surface-treating layer obtained by the present invention may be medical equipment or a medical material.

The thickness of the surface-treating layer is not limited. In the case of an optical member, the thickness of the surface-treating layer is in the range from 1 to 50 nm, more preferably in the range from 1 to 30 nm, particularly preferably in the range from 1 to 15 nm from the viewpoints of optical performance, surface lubricity, friction durability, and antifouling property.

In another embodiment, another layer may be formed on the surface of the base material, and thereafter a film of the surface-treating layer obtained by the present invention may be formed on the surface of such layer thereof.

The article obtained by use of the surface-treating agent of the present invention is as described above in detail. The application, the usage method, and the production method of the article of the surface-treating agent of the present invention are not limited to those recited above.

EXAMPLES

The PFPE-containing silane compound and the surface-treating agent of the present invention will be more specifically described with reference to the following Examples, but the present invention is not intended to be limited to these Examples.

Synthesis Example 1

A 100-mL four-necked flask equipped with a reflux condenser, a thermometer and a stirrer was charged with 10 g of a perfluoropolyether-modified allyl compound represented by the average composition $CF_3CF_2CF_2O(CF_2CF_2CF_2O)_{20}OCF_2CF_2CH_2CH=CH_2$, 10 g of 1,3-bis(trifluoromethyl)benzene, and 1.0 g of trichlorosilane, and the mixture was stirred at 5° C. under a nitrogen stream for 30 minutes. Subsequently, 0.05 ml of a solution containing 2% of a Pt complex of 1,3-divinyl-1,1,3,3-tetramethyldisiloxane in xylene was added thereto, and thereafter the resultant was heated to 60° C., and stirred at that temperature for 3 hours.

Thereafter, the volatile content was distilled off under reduced pressure, thereby providing 10.1 g of perfluoropolyether group-containing trichlorosilane compound (A) having trichlorosilane at a terminal, represented by the following formula.

Perfluoropolyether Group-Containing Trichlorosilane Compound (A):

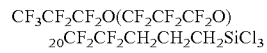

Synthesis Example 2

A 100-mL four-necked flask equipped with a reflux condenser, a thermometer and a stirrer was charged with 10.1 g of perfluoropolyether group-containing trichlorosilane compound (A) having trichlorosilane at a terminal, synthesized in Synthesis Example 1, and 15 g of 1,3-bis(trifluoromethyl)benzene, and the mixture was stirred at 5° C. under a nitrogen stream for 30 minutes. Subsequently, 10 ml of a solution containing 1.6 mol/L vinyl magnesium chloride in tetrahydrofuran was added thereto, and thereafter the resultant was heated to room temperature, and stirred at that temperature for 10 hours. Thereafter, the resultant was cooled to 5° C., 5 ml of methanol was added thereto, thereafter perfluorohexane was added thereto and the mixture was stirred for 30 minutes, and thereafter a perfluorohexane phase was collected by separation with a separating funnel. Subsequently, the volatile content was distilled off under reduced pressure, thereby providing 10.2 g of the following perfluoropolyether group-containing vinyl compound (B) having a vinyl group at a terminal.

Perfluoropolyether Group-Containing Vinyl Compound (B):

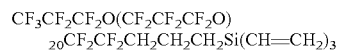

Synthesis Example 3

A 100-mL four-necked flask equipped with a reflux condenser, a thermometer and a stirrer was charged with 9.0 g of perfluoropolyether group-containing vinyl compound (B) having a vinyl group at a terminal, synthesized in Synthesis Example 2, 12 g of 1,3-bis(trifluoromethyl)benzene, and 3.0 g of trichlorosilane, and the mixture was stirred at 5° C. under a nitrogen stream for 30 minutes. Subsequently, 0.1 ml of a solution containing 2% of a Pt complex of 1,3-divinyl-1,1,3,3-tetramethyldisiloxane in xylene was added thereto, and thereafter the resultant was heated to 60° C., and stirred at that temperature for 3 hours. Thereafter, the volatile content was distilled off under reduced pressure, thereby providing 9.1 g of the following perfluoropolyether group-containing trichlorosilane compound (C) having trichlorosilane at a terminal.

Perfluoropolyether Group-Containing Trichlorosilane Compound (C):

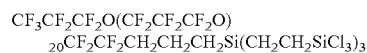

Synthesis Example 4

To a 100-mL four-necked flask equipped with a reflux condenser, a thermometer and a stirrer were added 9.1 g of perfluoropolyether group-containing trichlorosilane compound (C) having trichlorosilane at a terminal, synthesized in Synthesis Example 3, and 12 g of 1,3-bis(trifluoromethyl)

benzene, and the mixture was stirred at 50° C. under a nitrogen stream for 30 minutes. Subsequently, a mixed solution of 0.40 g of methanol and 13.2 g of trimethyl orthoformate was added, and thereafter the resultant was heated to 55° C., and stirred at that temperature for 3 hours. Thereafter, the volatile content was distilled off under reduced pressure, thereby providing 9.2 g of the following perfluoropolyether group-containing silane compound (D) having a trimethoxysilyl group at a terminal.

Perfluoropolyether Group-Containing Silane Compound (D):

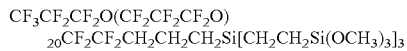
$$CF_3CF_2CF_2O(CF_2CF_2CF_2O)_{20}CF_2CF_2CH_2CH_2CH_2Si[CH_2CH_2Si(OCH_3)_3]_3$$

Synthesis Example 5

A 100-mL four-necked flask equipped with a reflux condenser, a thermometer and a stirrer was charged with 10 g of a perfluoropolyether-modified allyl compound represented by the average composition $CF_3O(CF_2CF_2O)_{20}(CF_2O)_{16}CF_2CH_2CH=CH_2$, 12 g of 1,3-bis(trifluoromethyl)benzene, and 1.2 g of trichlorosilane, and the mixture was stirred at 5° C. under a nitrogen stream for 30 minutes. Subsequently, 0.08 ml of a solution containing 2% of a Pt complex of 1,3-divinyl-1,1,3,3-tetramethyldisiloxane in xylene was added thereto, and thereafter the resultant was heated to 60° C., stirred at that temperature for 4 hours. Thereafter, the volatile content was distilled off under reduced pressure, thereby providing 10.1 g of perfluoropolyether group-containing trichlorosilane compound (E) having trichlorosilane at a terminal, represented by the following formula.

Perfluoropolyether Group-Containing Trichlorosilane Compound (E):

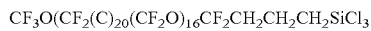
$$CF_3O(CF_2C)_{20}(CF_2O)_{16}CF_2CH_2CH_2CH_2SiCl_3$$

Synthesis Example 6

A 100-mL four-necked flask equipped with a reflux condenser, a thermometer and a stirrer was charged with 10.1 g of perfluoropolyether group-containing trichlorosilane compound (E) having trichlorosilane at a terminal, synthesized in Synthesis Example 5, and 12 g of 1,3-bis(trifluoromethyl)benzene, and the mixture was stirred at 5° C. under a nitrogen stream for 30 minutes. Subsequently, 9.5 ml of a solution containing 1.6 mol/L vinyl magnesium chloride in tetrahydrofuran was added thereto, and thereafter the resultant was heated to room temperature, and stirred at that temperature for 12 hours. Thereafter, the resultant was cooled to 5° C., 6 ml of methanol was added thereto, thereafter 20 g of perfluorohexane was added and the mixture was stirred for 30 minutes, and thereafter a perfluorohexane phase was collected by separation with a separating funnel. Subsequently, the volatile content was distilled off under reduced pressure, thereby providing 10.2 g of the following perfluoropolyether group-containing vinyl compound (F) having a vinyl group at a terminal.

Perfluoropolyether Group-Containing Vinyl Compound (F):

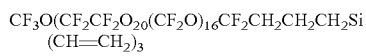
$$CF_3O(CF_2CF_2O_{20}(CF_2O)_{16}CF_2CH_2CH_2CH_2Si(CH=CH_2)_3$$

Synthesis Example 7

A 100-mL four-necked flask equipped with a reflux condenser, a thermometer and a stirrer was charged with 6.0 g of perfluoropolyether group-containing vinyl compound (F) having a vinyl group at a terminal, synthesized in Synthesis Example 6, 9 g of 1,3-bis(trifluoromethyl)benzene, and 1.5 g of trichlorosilane, and the mixture was stirred at 5° C. under a nitrogen stream for 30 minutes. Subsequently, 0.06 ml of a solution containing 2% of a Pt complex of 1,3-divinyl-1,1,3,3-tetramethyldisiloxane in xylene was added thereto, and thereafter the resultant was heated to 60° C., and stirred at that temperature for 2 hours. Thereafter, the volatile content was distilled off under reduced pressure, thereby providing 6.1 g of the following perfluoropolyether group-containing trichlorosilane compound (G) having trichlorosilane at a terminal.

Perfluoropolyether Group-Containing Trichlorosilane Compound (G):

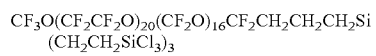
$$CF_3O(CF_2CF_2O)_{20}(CF_2O)_{16}CF_2CH_2CH_2CH_2Si(CH_2CH_2SiCl_3)_3$$

Synthesis Example 8

To a 100-mL four-necked flask equipped with a reflux condenser, a thermometer and a stirrer were added 6.1 g of perfluoropolyether group-containing trichlorosilane compound (G) having trichlorosilane at a terminal, synthesized in Synthesis Example 7, and 9 g of 1,3-bis(trifluoromethyl)benzene, and the mixture was stirred at 50° C. under a nitrogen stream for 30 minutes. Subsequently, a mixed solution of 0.25 g of methanol and 8.3 g of trimethyl orthoformate was added, and thereafter the resultant was heated to 55° C., and stirred at that temperature for 3 hours. Thereafter, the volatile content was distilled off under reduced pressure, thereby providing 6.2 g of the following perfluoropolyether group-containing silane compound (H) having a trimethoxysilyl group at a terminal.

Perfluoropolyether Group-Containing Silane Compound (H):

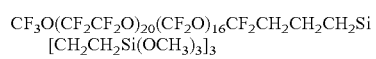
$$CF_3O(CF_2CF_2O)_{20}(CF_2O)_{16}CF_2CH_2CH_2CH_2Si[CH_2CH_2Si(OCH_3)_3]_3$$

Synthesis Example 9

A 50-mL three-necked flask equipped with a reflux condenser, a thermometer and a stirrer was charged with 5.0 g of a perfluoropolyether-modified allyl compound represented by the average composition $CF_3O(CF_2CF_2O)_{20}(CF_2O)28CF_2CH_2CH=CH_2$, 6 g of 1,3-bis(trifluoromethyl)benzene and 0.51 g of trichlorosilane, and the mixture was stirred at 5° C. under a nitrogen stream for 30 minutes. Subsequently, 0.04 ml of a solution containing 2% of a Pt complex of 1,3-divinyl-1,1,3,3-tetramethyldisiloxane in xylene was added thereto, and thereafter the resultant was heated to 60° C., and stirred at that temperature for 4 hours. Thereafter, the volatile content was distilled off under reduced pressure, thereby providing 5.0 g of the following perfluoropolyether group-containing trichlorosilane compound (I) having trichlorosilane at a terminal.

Perfluoropolyether Group-Containing Trichlorosilane Compound (I):

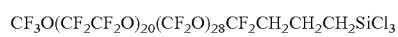
$$CF_3O(CF_2CF_2O)_{20}(CF_2O)_{28}CF_2CH_2CH_2CH_2SiCl_3$$

Synthesis Example 10

A 50-mL three-necked flask equipped with a reflux condenser, a thermometer and a stirrer was charged with 5.0 g of perfluoropolyether group-containing trichlorosilane compound (I) having trichlorosilane at a terminal, synthesized in Synthesis Example 9, and 6 g of 1,3-bis(trifluoromethyl)benzene, and the mixture was stirred at 5° C. under a nitrogen stream for 30 minutes. Subsequently, 4.3 ml of a solution containing 1.6 mol/L vinyl magnesium chloride in tetrahydrofuran was added thereto, and thereafter the resultant was heated to room temperature, and stirred at that temperature for 12 hours. Thereafter, the resultant was cooled to 5° C., 3 ml of methanol was added thereto, thereafter 10 g of perfluorohexane was added thereto and the mixture was stirred for 30 minutes, and thereafter a perfluorohexane phase was collected by separation with a separating funnel. Subsequently, the volatile content was distilled off under reduced pressure, thereby providing 4.9 g of the following perfluoropolyether group-containing vinyl compound (J) having a vinyl group at a terminal.

Perfluoropolyether Group-Containing Vinyl Compound (J):

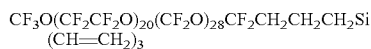
$CF_3O(CF_2CF_2O)_{20}(CF_2O)_{28}CF_2CH_2CH_2CH_2Si(CH=CH_2)_3$

Synthesis Example 11

A 50-mL three-necked flask equipped with a reflux condenser, a thermometer and a stirrer was charged with 4.0 g of perfluoropolyether group-containing vinyl compound (J) having a vinyl group at a terminal, synthesized in Synthesis Example 10, 5 g of 1,3-bis(trifluoromethyl)benzene, and 1.0 g of trichlorosilane, and the mixture was stirred at 5° C. under a nitrogen stream for 30 minutes. Subsequently, 0.07 ml of a solution containing 2% of a Pt complex of 1,3-divinyl-1,1,3,3-tetramethyldisiloxane in xylene was added thereto, and thereafter the resultant was heated to 60° C., and stirred at that temperature for 2 hours. Thereafter, the volatile content was distilled off under reduced pressure, thereby providing 3.9 g of the following perfluoropolyether group-containing trichlorosilane compound (K) having trichlorosilane at a terminal.

Perfluoropolyether Group-Containing Trichlorosilane Compound (K):

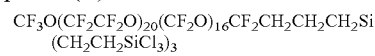
$CF_3O(CF_2CF_2O)_{20}(CF_2O)_{16}CF_2CH_2CH_2CH_2Si(CH_2CH_2SiCl_3)_3$

Synthesis Example 12

To a 50-mL three-necked flask equipped with a reflux condenser, a thermometer and a stirrer were added 3.9 g of perfluoropolyether group-containing trichlorosilane compound (K) having trichlorosilane at a terminal, synthesized in Synthesis Example 11, and 5 g of 1,3-bis(trifluoromethyl)benzene, and the mixture was stirred at 50° C. under a nitrogen stream for 30 minutes. Subsequently, a mixed solution of 0.13 g of methanol and 4.3 g of trimethyl orthoformate was added, and thereafter the resultant was heated to 55° C., and stirred at that temperature for 3 hours. Thereafter, the volatile content was distilled off under reduced pressure, thereby providing 4.0 g of the following perfluoropolyether group-containing silane compound (L) having a trimethoxysilyl group at a terminal.

Perfluoropolyether Group-Containing Silane Compound (L) (e/f Ratio 0.71):

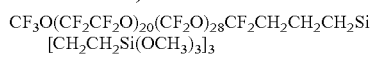
$CF_3O(CF_2CF_2O)_{20}(CF_2O)_{28}CF_2CH_2CH_2CH_2Si[CH_2CH_2Si(OCH_3)_3]_3$

Synthesis Example 13

A 100-mL four-necked flask equipped with a reflux condenser, a thermometer and a stirrer was charged with 10 g of a perfluoropolyether-modified allyl compound represented by the average composition $CF_3CF_2CF_2O(CF_2CF_2CF_2O)_{30}CF_2CF_2CH_2CH=CH_2$, 10 g of 1,3-bis(trifluoromethyl)benzene and 0.7 g of trichlorosilane, and the mixture was stirred at 5° C. under a nitrogen stream for 30 minutes. Subsequently, 0.04 ml of a solution containing 2% of a Pt complex of 1,3-divinyl-1,1,3,3-tetramethyldisiloxane in xylene was added thereto, and thereafter the resultant was heated to 60° C., and stirred at that temperature for 3 hours. Thereafter, the volatile content was distilled off under reduced pressure, thereby providing 10.1 g of perfluoropolyether group-containing trichlorosilane compound (M) having trichlorosilane at a terminal, represented by the following formula.

Perfluoropolyether Group-Containing Trichlorosilane Compound (M):

$CF_3CF_2CF_2O(CF_2CF_2CF_2O)_{30}CF_2CF_2CH_2CH_2CH_2SiCl_3$

Synthesis Example 14

A 100-mL four-necked flask equipped with a reflux condenser, a thermometer and a stirrer was charged with 10.1 g of perfluoropolyether group-containing trichlorosilane compound (M) having trichlorosilane at a terminal, synthesized in Synthesis Example 13, and 15 g of 1,3-bis(trifluoromethyl)benzene, and the mixture was stirred at 5° C. under a nitrogen stream for 30 minutes. Subsequently, 7.5 ml of a solution containing 1.6 mol/L vinyl magnesium chloride in tetrahydrofuran was added thereto, and thereafter the resultant was heated to room temperature, and stirred at that temperature for 10 hours. Thereafter, the resultant was cooled to 5° C., 5 ml of methanol was added thereto, thereafter perfluorohexane was added thereto and the mixture was stirred for 30 minutes, and thereafter a perfluorohexane phase was collected by separation with a separating funnel. Subsequently, the volatile content was distilled off under reduced pressure, thereby providing 10.2 g of the following perfluoropolyether group-containing vinyl compound (N) having a vinyl group at a terminal.

Perfluoropolyether Group-Containing Vinyl Compound (N):

$CF_3CF_2CF_2O(CF_2CF_2CF_2O)_{30}CF_2CF_2CH_2CH_2CH_2Si(CH=CH_2)_3$

Synthesis Example 15

A 100-mL four-necked flask equipped with a reflux condenser, a thermometer and a stirrer was charged with 9.0 g of perfluoropolyether group-containing vinyl compound (N) having vinyl group at a terminal, synthesized in Synthesis Example 14, 12 g of 1,3-bis(trifluoromethyl)benzene and 2.4 g of trichlorosilane, and the mixture was stirred at 5° C. under a nitrogen stream for 30 minutes. Subsequently, 0.07 ml of a solution containing 2% of a Pt complex of 1,3-divinyl-1,1,3,3-tetramethyldisiloxane in xylene was added thereto, and thereafter the resultant was heated to 60° C., and stirred at that temperature for 3 hours. Thereafter, the volatile content was distilled off under reduced pressure, thereby providing 9.1 g of the following perfluoropolyether group-containing trichlorosilane compound (O) having trichlorosilane at a terminal.

Perfluoropolyether Group-Containing Trichlorosilane Compound (O):

$CF_3CF_2CF_2O(CF_2CF_2CF_2O)_{30}CF_2CF_2CH_2CH_2CH_2Si(CH_2CH_2SiCl_3)_3$

Synthesis Example 16

To a 100-mL four-necked flask equipped with a reflux condenser, a thermometer and a stirrer were added 9.1 g of perfluoropolyether group-containing trichlorosilane compound (O) having trichlorosilane at a terminal, synthesized in Synthesis Example 15, and 12 g of 1,3-bis(trifluoromethyl)benzene, and the mixture was stirred at 50° C. under a nitrogen stream for 30 minutes. Subsequently, a mixed solution of 0.32 g of methanol and 1.06 g of trimethyl orthoformate was added, and thereafter the resultant was heated to 55° C., and stirred at that temperature for 3 hours. Thereafter, the volatile content was distilled off under reduced pressure, thereby providing 9.2 g of the following perfluoropolyether group-containing silane compound (P) having a trimethoxysilyl group at a terminal.

Perfluoropolyether Group-Containing Silane Compound (P):

$$CF_3CF_2CF_2O(CF_2CF_2CF_2O)_{30}CF_2CF_2CH_2CH_2CH_2Si[CH_2CH_2Si(OCH_3)_3]$$

Synthesis Example 17

A 300-mL four-necked flask equipped with a reflux condenser, a thermometer and a stirrer was charged with 10 g of a perfluoropolyether-modified iodine compound represented by the average composition $CF_3O(CF_2CF_2O)_{20}(CF_2O)_{16}CF_2I$, 100 g of 1,3-bis(trifluoromethyl)benzene and 30 g of $C(CH=CH_2)_4$, 0.3 g of di-tert-butylperoxide was added thereto, and the mixture was stirred at 120° C. for 16 hours. Thereafter, the mixture was cooled to 5° C., 0.84 g of a zinc powder and 5 ml of methanol were added thereto, and the resultant was stirred at 45° C. for 7 hours. Subsequently, 100 g of perfluorohexane and 30 g of acetone were added thereto, the resultant was stirred for 30 minutes, a perfluorohexane phase was collected by separation with a separating funnel, and thereafter the volatile content was distilled off under reduced pressure, thereby providing 9.8 g of perfluoropolyether group-containing vinyl compound (Q) having iodine at a terminal, represented by the following formula.

Perfluoropolyether Group-Containing Vinyl Compound Q):

$$CF_3O(CF_2CF_2)_{20}(CF_2O)_{16}CF_2CH_2CH_2C(CH=CH_2)_3$$

Synthesis Example 18

A 100-mL four-necked flask equipped with a reflux condenser, a thermometer and a stirrer was charged with 9.0 g of perfluoropolyether group-containing vinyl compound (Q) having a vinyl group at a terminal, synthesized in Synthesis Example 17, 13 g of 1,3-bis(trifluoromethyl)benzene, and 2.3 g of trichlorosilane, and the mixture was stirred at 5° C. under a nitrogen stream for 30 minutes. Subsequently, 0.09 ml of a solution containing 2% of a Pt complex of 1,3-divinyl-1,1,3,3-tetramethyldisiloxane in xylene was added thereto, and thereafter the resultant was heated to 60° C., and stirred at that temperature for 2 hours. Thereafter, the volatile content was distilled off under reduced pressure, thereby providing 9.2 g of the following perfluoropolyether group-containing trichlorosilane compound (R) having trichlorosilane at a terminal.

Perfluoropolyether Group-Containing Trichlorosilane Compound (R):

$$CF_3O(CF_2CF_2O)_{20}(CF_2O)_{16}CF_2CH_2CH_2C(CH_2CH_2SiCl_3)_3$$

Synthesis Example 19

To a 100-mL four-necked flask equipped with a reflux condenser, a thermometer and a stirrer were added 6.0 g of perfluoropolyether group-containing trichlorosilane compound (R) having trichlorosilane at a terminal, synthesized in Synthesis Example 18, and 9 g of 1,3-bis(trifluoromethyl)benzene, and the mixture was stirred at 50° C. under a nitrogen stream for 30 minutes. Subsequently, a mixed solution of 0.25 g of methanol and 8.2 g of trimethyl orthoformate was added, and thereafter the resultant was heated to 55° C., and stirred at that temperature for 3 hours. Thereafter, the volatile content was distilled off under reduced pressure, thereby providing 6.1 g of the following perfluoropolyether group-containing silane compound (S) having a trimethoxysilyl group at a terminal.

Perfluoropolyether Group-Containing Silane Compound (S):

$$CF_3O(CF_2CF_2O)_{20}(CF_2O)_{16}CF_2CH_2CH_2C[CH_2CH_2Si(OCH_3)_3]_3$$

Example 1

Compound (D) obtained in Synthesis Example 4 was dissolved in hydrofluoroether (NOVEC HFE 7200 manufactured by 3M) so that the concentration was 20% by weight, thereby preparing surface-treating agent 1.

Surface-treating agent 1 prepared above was vapor-deposited on chemically reinforced glass ("Gorilla" glass having a thickness of 0.7 mm, manufactured by Corning Incorporated,). Such a vacuum deposition treatment was at a pressure of $3.0 \times 10^{-3}$ Pa. First, silicon dioxide at a thickness of 7 nm was deposited on the surface of the chemically reinforced glass to form a silicon dioxide film, and subsequently 2 mg of a surface-treating agent (namely, containing 0.4 mg of compound (D)) per the chemically reinforced glass (55 mm×100 mm) was deposited. Thereafter, the chemically reinforced glass with a deposited film was left to still stand under an atmosphere of a temperature of 20° C. and a humidity of 65% for 24 hours. Thus, the deposited film was cured, thereby forming a surface-treating layer.

Example 2

A surface-treating agent was prepared and a surface-treating layer was formed in the same manner as in Example 1 except that compound (H) was used instead of compound (D).

Examples 3 to 5

Each surface-treating agent was prepared and each surface-treating layer was formed in the same manner as in Example 1 except that compound (L), compound (P), compound (S) was used instead of compound (D).

Comparative Examples 1 and 2

A surface-treating agent was prepared and a surface-treating layer was formed in the same manner as in Example 1 except that the following control compound 1 or 2 was used instead of compound (D).

Control Compound 1

$$CF_3CF_2CF_2O(CF_2CF_2CF_2O)_{20}CF_2CF_2CH_2CH_2CH_2Si[CH_2CH_2CH_2Si(OCH_3)_3]_3$$

Control Compound 2

CF$_3$O(CF$_2$CF$_2$O)$_{20}$(CF$_2$O)$_{16}$CF$_2$CH$_2$CH$_2$CH$_2$Si[CH$_2$CH$_2$CH$_2$Si(OCH$_3$)$_3$]$_3$ (Evaluation)

Measurement of Static Contact Angle

The static contact angle of water with each of the surface-treating layers obtained in Examples 1 to 5 and Comparative Examples 1 to 2 was measured. The measurement of the static contact angel of water was performed for 1 μL of water in an environment of 21° C. and a humidity of 65% by using a contact angle measurement apparatus (manufactured by Kyowa Interface Science, Inc.).

Evaluation of Friction Durability

The static contact angle of water with a surface of each of the surface-treating layers formed, with which not still contacted with anything after formation was measured as an initial evaluation.

Each of the surface-treating layers of Examples or Comparative Examples, formed on the surface of the base material, was irradiated with UV from a 7.5 kw water cooling xenon lamp by use of a super xenon weather meter Model SX75 (manufactured by Suga Test Instruments Co., Ltd.) for 300 hours. The irradiation conditions were as follows: the irradiance at wavelengths of 300 nm to 400 nm was 62 W/m$^2$, the temperature of a black panel of the base material was 55° C., and the distance between the lamp and the surface of the base material was 29 cm.

Each of the surface-treating layers before UV irradiation and each of the surface-treating layers after UV irradiation were subjected to the following friction durability test as follows.

A sample article on which each of the surface-treating layers was formed was horizontally arranged, the following friction block was brought into contact with the surface of each of the surface-treating layers (the contact surface had a circular shape having a diameter of 1 cm), a load of 5 N was applied thereonto, and thereafter the friction block was allowed to reciprocate at a rate of 40 mm/sec with the load being applied. The friction block was allowed to reciprocate at most 4000 times, and the static contact angle of water (degrees) was measured every a number of times of reciprocation (number of times of friction) of 1000. The test was stopped when the measurement value of the static contact angle of water was decreased to less than 60 degrees. The results are shown in Tables 1 and 2 (the sign "-" in the Table means no measurement).

Friction Block

A silicone gum shown below, the surface (diameter: 1 cm) of which was covered with a cotton impregnated with artificial sweat having the following composition, was used as a friction block.

Composition of Artificial Sweat

Anhydrous disodium hydrogen phosphate: 2 g
Sodium chloride: 20 g
85% Lactic acid: 2 g
Histidine hydrochloride: 5 g
Distilled water: 1 kg Silicone Gum Silicone rubber plug SR-51 manufactured by Tigers Polymer Corporation, processed into a cylinder shape having a diameter of 1 cm and a thickness of 1 cm.

TABLE 1

| Number of times of friction (times) | Example 1 | | Example 2 | | Example 3 | | Comparative Example 1 | | Comparative Example 2 | |
|---|---|---|---|---|---|---|---|---|---|---|
| | Before UV irradiation | After UV irradiation | Before UV irradiation | After UV irradiation | Before UV irradiation | After UV irradiation | Before UV irradiation | After UV irradiation | Before UV irradiation | After UV irradiation |
| 0 | 116 | 114 | 116 | 115 | 116 | 115 | 116 | 114 | 116 | 115 |
| 1000 | 111 | 106 | 113 | 108 | 115 | 110 | 109 | 94 | 112 | 95 |
| 2000 | 107 | 93 | 111 | 98 | 112 | 103 | 104 | 65 | 108 | 68 |
| 3000 | 101 | 78 | 107 | 86 | 109 | 92 | 96 | 44 | 102 | 52 |
| 4000 | 95 | 63 | 103 | 72 | 106 | 78 | 92 | — | 99 | — |

TABLE 2

| Number of times of friction (times) | Example 4 | | Example 5 | |
|---|---|---|---|---|
| | Before UV irradiation | After UV irradiation | Before UV irradiation | After UV irradiation |
| 0 | 116 | 115 | 116 | 115 |
| 1000 | 112 | 108 | 114 | 106 |
| 2000 | 109 | 100 | 111 | 95 |
| 3000 | 104 | 89 | 106 | 84 |
| 4000 | 100 | 76 | 104 | 70 |

It was found from the results in Tables 1 and 2 that the surface-treating layers of Examples 1 to 5, before UV irradiation, were suppressed in a decrease in contact angle and had excellent friction durability as compared with the surface-treating layers of Comparative Examples 1 and 2, before UV irradiation. The reason for this was considered because the surface-treating agents of Examples 1 to 5 allowed the respective surface-treating layers to be enhanced in frictional resistance due to PFPE chains densely oriented owing to the presence of —CH$_2$CH$_2$— as a linker of silicon-silicon.

It was further found that the surface-treating layers of Examples 1 to 5, after UV irradiation, were suppressed in a decrease in contact angle due to UV irradiation as compared with the surface-treating layers of Comparative Examples 1 and 2, after UV irradiation. The reason for this was considered because the surface-treating layers formed in Examples 1 to 5 were suppressed in decomposition of the surface-treating layers due to UV irradiation. In other words, it has been confirmed that the surface-treating layer formed by use of the perfluoropolyether group-containing silane compound of the present invention, having —CH$_2$CH$_2$— as a linker of silicon-silicon, is enhanced in UV resistance.

The e/f ratio of compound (H) contained in the surface-treating agent in Example 2 was 1.25, and the e/f ratio of compound (L) in the surface-treating agent of Example 3 was 0.71. It was considered that compound (L) contained in the surface-treating agent in Example 3 was lower in the content of a ($CF_2CF_2O$) unit than the content of a ($CF_2O$) unit and therefore the surface-treating layer formed was easily slid to result in a further enhancement in friction durability.

INDUSTRIAL APPLICABILITY

The present invention can be suitably utilized for forming a surface-treating layer on surfaces of various base materials, in particular, on a surface of an optical member required to have permeability.

The present invention includes following embodiments:

[1]

A perfluoro(poly)ether group-containing silane compound represented by any of formula (A1), (A2), (B1) or (B2):

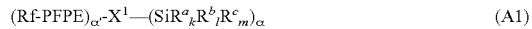   (A1)

   (A2)

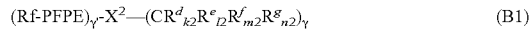   (B1)

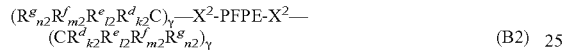   (B2)

wherein:

PFPE represents, each independently at each occurrence, a group represented by formula:

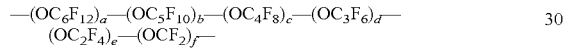

wherein a, b, c, d, e and f are each independently an integer of 0 or more and 200 or less, the sum of a, b, c, d, e and f is at least 1, and the occurrence order of respective repeating units in parentheses with a, b, c, d, e or f is not limited in the formula;

Rf represents, each independently at each occurrence, an alkyl group having 1 to 16 carbon atoms, optionally substituted with one or more fluorine atoms;

$X^1$ represents, each independently at each occurrence, a single bond or a di- to decavalent organic group;

α is, each independently at each occurrence, an integer of 1 to 9;

α' is each independently an integer of 1 to 9;

$R^a$ represents, each independently at each occurrence, —$CH_2CH_2$—$SiR^{23}_{r2}R^{24}_{s2}$;

$R^{23}$ represent a hydroxyl group or a hydrolyzable group;

$R^{24}$ represent a hydrogen atom or a monovalent organic group;

r2 is, each independently at each occurrence, an integer of 1 to 3;

s2 is, each independently at each occurrence, an integer of 0 to 2;

provided that the sum of r2 and s2 in each —$CH_2CH_2$—$SiR^{23}_{r2}R^{24}_{s2}$ is 3;

$R^b$ represents, each independently at each occurrence, —Z—$SiR^{11}_{p1}R^{12}_{q1}R^{13}_{r1}R^{4}_{s1}$;

Z represents, each independently at each occurrence, an oxygen atom or a divalent organic group;

$R^{11}$ represents, each independently at each occurrence, $R^{a'}$;

$R^{a'}$ has the same meaning as $R^a$;

$R^{12}$ represents, each independently at each occurrence, $R^{b'}$;

$R^{b'}$ has the same meaning as $R^b$;

the number of Si atoms linearly linked via a Z group in $R^b$ is at most 5;

$R^{13}$ represents, each independently at each occurrence, a hydroxyl group or a hydrolyzable group;

$R^{14}$ represents, each independently at each occurrence, a hydrogen atom or a monovalent organic group;

p1 is, each independently at each occurrence, an integer of 0 to 3;

p1 is, each independently at each occurrence, an integer of 0 to 3;

r1 is, each independently at each occurrence, an integer of 0 to 3;

s1 is, each independently at each occurrence, an integer of 0 to 3;

provided that the sum of p1, q1, r1 and s1 in each —Z—$SiR^{11}_{p1}R^{12}_{q1}R^{13}_{r1}R^{14}_{s1}$ is 3;

$R^c$ represents, each independently at each occurrence, a hydrogen atom, a hydroxyl group, a hydrolyzable group or a monovalent organic group;

k is, each independently at each occurrence, an integer of 0 to 3;

l is, each independently at each occurrence, an integer of 0 to 3;

m is, each independently at each occurrence, an integer of 0 to 3;

provided that the sum of k, l and m in each —$SiR^a_k R^b_l R^c_m$ is 3, in the formulae (A1) and (A2), a Si atom to which at least one $R^a$ or $R^{a'}$ is bound and to which $R^b$ or $R^{b'}$ comprising any of at least $R^{13}$ or $R^{23}$ is optionally further bound, in which the sum of $R^a$, $R^{a'}$, $R^b$ and $R^{b'}$ is 2 or more, is present;

$X^2$ represents, each independently at each occurrence, a single bond or a di- to decavalent organic group;

γ is, each independently at each occurrence, an integer of 1 to 9;

γ' is each independently an integer of 1 to 9;

$R^d$ represents, each independently at each occurrence, —$CH_2CH_2$—$SiR^{73}_{n4}R^{74}_{3-n4}$;

$R^{73}$ represents, each independently at each occurrence, a hydroxyl group or a hydrolyzable group;

$R^{74}$ represents, each independently at each occurrence, a hydrogen atom or a monovalent organic group;

n4 is, each independently at each occurrence, an integer of 1 to 3;

$R^e$ represents, each independently at each occurrence, —Y'—$SiR^{83}_{n3}R^{84}_{3-n3}$;

Y' represents, each independently at each occurrence, a divalent organic group;

$R^{83}$ represents, each independently at each occurrence, a hydroxyl group or a hydrolyzable group;

$R^{84}$ represents, each independently at each occurrence, a hydrogen atom or a monovalent organic group;

n3 is an integer of 0 to 3;

$R^f$ represents, each independently at each occurrence, —Z'—$CR^{61}_{p5}R^{62}_{q5}R^{63}_{r5}R^{64}_{s5}$;

Z' has the same meaning as Z;

$R^{61}$ represents, each independently at each occurrence, $R^{d'}$;

$R^{d'}$ has the same meaning as $R^d$;

$R^{62}$ represents, each independently at each occurrence, —Y—$SiR^{83}_{n3}R^{84}_{3-n3}$;

Y represents, each independently at each occurrence, a divalent organic group;

$R^{63}$ represents, each independently at each occurrence, $R^{f'}$;

$R^{f'}$ has the same meaning as $R^f$;

$R^{64}$ represents, each independently at each occurrence, a hydroxyl group, a hydrogen atom or a monovalent organic group;

the number of C atoms linearly linked via a Z' group in $R^f$ is at most 5;

p5 is an integer of 0 to 3;
q5 is an integer of 0 to 3;
r5 is an integer of 0 to 3;
s5 is an integer of 0 to 3;
provided that the sum of p5, q5, r5, and s5 in each —Z'—$CR^{61}_{p5}R^{62}_{q5}R^{63}_{r5}R^{64}_{s5}$ is 3;

$R^g$ represents, each independently at each occurrence, a hydrogen atom, a hydroxyl group, or a monovalent organic group;

k2 is, each independently at each occurrence, an integer of 0 to 3;
l2 is, each independently at each occurrence, an integer of 0 to 3;
m2 is, each independently at each occurrence, an integer of 0 to 3;
n2 is, each independently at each occurrence, an integer of 0 to 3;
provided that the sum of k2, l2, m2 and n2 in each —$CR^d_{k2}R^e_{l2}R^f_{m2}R^g_{n2}$ is 3; and in the formulae (B1) and (B2), at least one $R^d$ or $R^{d'}$ is present and at least two groups represented by —$SiR^{73}$ or —$SiR^{83}$ are present.

[2]
The perfluoro(poly)ether group-containing silane compound according to [1], represented by any of formula (A1) or formula (A2).

[3]
The perfluoro(poly)ether group-containing silane compound according to [1], represented by any of formula (B1) or formula (B2).

[4]
The perfluoro(poly)ether group-containing silane compound according to any one of [1] to [3], wherein Rf is, independently at each occurrence, a perfluoroalkyl group having 1 to 16 carbon atoms.

[5]
The perfluoro(poly)ether group-containing silane compound according to any one of [1] to [4], wherein
PFPE is represented, independently at each occurrence, by the following formula (a), (b) or (c):

—$(OC_3F_6)_d$—    (a)

wherein d is an integer of 1 to 200;

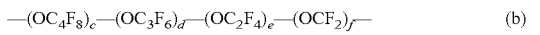

—$(OC_4F_8)_c$—$(OC_3F_6)_d$—$(OC_2F_4)_e$—$(OCF_2)_f$—    (b)

wherein c and d are each independently an integer of 0 or more and 30 or less;
e and f are each independently an integer of 1 or more and 200 or less;
the sum of c, d, e and f is an integer of 10 or more and 200 or less; and
the occurrence order of respective repeating units in parentheses with a suffix c, d, e or f is not limited in the formula;

—$(R^6$—$R^7)_j$—    (c)

wherein $R^6$ is $OCF_2$ or $OC_2F_4$;
$R^7$ is a group selected from $OC_2F_4$, $OC_3F_6$, $OC_4F_8$, $OC_5F_{10}$ and $OC_6F_{12}$, or a combination of two or three groups selected therefrom; and
j is an integer of 2 to 100.

[6]
The perfluoro(poly)ether group-containing silane compound according to any one of [1] to [5], wherein an Rf-PFPE moiety each independently has a number average molecular weight of 500 to 30,000.

[7]
The perfluoro(poly)ether group-containing silane compound according to any one of [1] to [6], wherein $X^1$ is, each independently at each occurrence, a divalent organic group, and a and α' are each 1.

[8]
The perfluoro(poly)ether group-containing silane compound according to any one of [1] to [7], wherein r2 is 3.

[9]
The perfluoro(poly)ether group-containing silane compound according to any one of [1] to [8], wherein Z is a divalent organic group.

[10]
The perfluoro(poly)ether group-containing silane compound according to any one of [1] to [9], wherein Z is —$CH_2CH_2$—.

[11]
The perfluoro(poly)ether group-containing silane compound according to any one of [1] to [10], wherein at least one k is 2 or more, or at least one p1 is 2 or more.

[12]
The perfluoro(poly)ether group-containing silane compound according to any one of [1] to [11], wherein at least one k is 3 or more, or at least one p1 is 3 or more.

[13]
The perfluoro(poly)ether group-containing silane compound according to any one of [1] to [12], wherein k is 3.

[14]
The perfluoro(poly)ether group-containing silane compound according to any one of [1] to [13], wherein $X^2$ is, each independently at each occurrence, a single bond, —$CH_2$—, —$CH_2CH_2$—, or —$CH_2CH_2CH_2$—.

[15]
The perfluoro(poly)ether group-containing silane compound according to any one of [1] to [14], wherein k2 is 3.

[16]
A surface-treating agent comprising the perfluoro(poly)ether group-containing silane compound according to any one of [1] to [15].

[17]
The surface-treating agent according to [16], further comprising one or more other components selected from a fluorine-containing oil, a silicone oil, an alcohol, a catalyst, a transition metal, a halide ion, and a compound containing an atom having an unshared electron pair in a molecular structure.

[18]
The surface-treating agent according to [16] or [17], further comprising a solvent.

[19]
The surface-treating agent according to any one of [16] to [18], which is used as an antifouling coating agent or a water-proof coating agent.

[20]
The surface-treating agent according to any one of [16] to [19], for vacuum deposition.

[21]
A pellet comprising the surface-treating agent according to any one of [16] to [20].

[22]
An article comprising a base material, and a layer formed from the perfluoro(poly)ether group-containing silane compound according to any one of [1] to [15] or the surface-treating agent according to any one of [16] to [20], on the surface of the base material.

[23]

The article according to [22], wherein the article is an optical member.

The invention claimed is:

1. A perfluoro(poly)ether group-containing silane compound represented by any of formula (A1) or (B1):

Rf-PFPE-X$^1$—SiR$^a_3$ (A1)

Rf-PFPE-X$^2$—CR$^d_3$ (B1)

wherein:
PFPE represents, each independently at each occurrence, a group represented by formula:

—(OC$_6$F$_{12}$)$_a$—(OC$_5$F$_{10}$)$_b$—(OC$_4$F$_8$)$_c$—(OC$_3$F$_6$)$_d$—(OC$_2$F$_4$)$_e$—(OCF$_2$)$_f$— wherein a, b, c, d, e and f are each independently an integer of 0 or more and 50 or less, the sum of a, b, c, d, e and f is 20 to 50, and the occurrence order of respective repeating units in parentheses with a, b, c, d, e or f is not limited in the formula;

Rf represents, each independently at each occurrence, a perfluoroalkyl group having 1 to 16 carbon atoms;

X$^1$ represents, each independently at each occurrence, an alkylene group having 1 to 3 carbon atoms;

R$^a$ represents, each independently at each occurrence, —CH$_2$CH$_2$—SiR$^2_3$;

R$^{23}$ represent a hydroxyl group or a hydrolyzable group;

X$^2$ represents, each independently at each occurrence, an alkylene group having 1 to 3 carbon atoms;

R$^d$ represents, each independently at each occurrence, —CH$_2$CH$_2$—SiR$^{73}_3$;

R$^{73}$ represents, each independently at each occurrence, a hydroxyl group or a hydrolyzable group.

2. The perfluoro(poly)ether group-containing silane compound according to claim 1, represented by formula (A1).

3. The perfluoro(poly)ether group-containing silane compound according to claim 1, represented by formula (B1).

4. The perfluoro(poly)ether group-containing silane compound according to claim 1, wherein
PFPE is represented, independently at each occurrence, by the following formula (a), (b) or (c):

—(OC$_3$F$_6$)$_d$— (a)

wherein d is an integer of 20 to 50;

—(OC$_4$F$_8$)$_c$—(OC$_3$F$_6$)$_d$—(OC$_2$F$_4$)$_e$—(OCF$_2$)$_f$— (b)

wherein c and d are each independently an integer of 0 or more and 30 or less;

e and f are each independently an integer of 1 or more and 50 or less;

the sum of c, d, e and f is an integer of 20 or more and 50 or less; and the occurrence order of respective repeating units in parentheses with a suffix c, d, e or f is not limited in the formula;

—(R$^6$—R$^7$)$_j$— (c)

wherein R$^6$ is OCF$_2$ or OC$_2$F$_4$;

R$^7$ is, each independently at each occurrence, a group selected from OC$_2$F$_4$, OC$_3$F$_6$, OC$_4$F$_8$, OC$_5$F$_{10}$ and OC$_6$F$_{12}$; and j is an integer of 10 to 25.

5. The perfluoro(poly)ether group-containing silane compound according to claim 1, wherein the Rf-PFPE moiety has a number average molecular weight of 500 to 30,000.

6. The perfluoro(poly)ether group-containing silane compound according to claim 1, wherein X$^2$ is, each independently at each occurrence, —CH$_2$—, —CH$_2$CH$_2$—, or —CH$_2$CH$_2$CH$_2$—.

7. A surface-treating agent comprising the perfluoro(poly)ether group-containing silane compound according to claim 1.

8. The surface-treating agent according to claim 7, further comprising one or more other components selected from a fluorine-containing oil, a silicone oil, an alcohol, a catalyst, a transition metal, a halide ion, and a compound containing an atom having an unshared electron pair in a molecular structure.

9. The surface-treating agent according to claim 7, further comprising a solvent.

10. The surface-treating agent according to claim 7, which is used as an antifouling coating agent or a water-proof coating agent.

11. The surface-treating agent according to claim 7, for vacuum deposition.

12. A pellet comprising the surface-treating agent according to claim 7.

13. An article comprising a base material, and a layer formed from the perfluoro(poly)ether group-containing silane compound according to claim 1, on the surface of the base material.

14. The article according to claim 13, wherein the article is an optical member.

* * * * *